United States Patent
Tsuzuki et al.

(10) Patent No.: US 6,252,641 B1
(45) Date of Patent: Jun. 26, 2001

(54) LIQUID CRYSTAL DEVICE AND LIQUID CRYSTAL APPARATUS

(75) Inventors: Hidetoshi Tsuzuki, Yokohama; Masaru Kamio, Sagamihara; Shinjiro Okada, Isehara; Akira Tsuboyama, Sagamihara; Hiroyuki Tokunaga, Fujisawa; Haruo Tomono, Machida; Koichi Sato, Atsugi; Yuji Matsuo, Machida; Kazunori Katakura, Atsugi; Yuko Yokoyama, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/874,458

(22) Filed: Jun. 17, 1997

(30) Foreign Application Priority Data

Jun. 17, 1996 (JP) ................................. 8-155503
Jun. 11, 1997 (JP) ................................. 9-153664

(51) Int. Cl.⁷ ............... G02F 1/1333; G02F 1/1343; C09K 19/52

(52) U.S. Cl. ............... 349/122; 349/106; 349/138; 349/139; 349/147; 349/148; 349/184; 428/1.1

(58) Field of Search ............... 252/299.01; 349/148, 349/106, 122, 138, 184, 147, 139, 123; 428/1.1, 1.5

(56) References Cited

U.S. PATENT DOCUMENTS

| | | | |
|---|---|---|---|
| 4,712,874 | 12/1987 | Sekimura et al. | 350/339 |
| 4,728,176 | * 3/1988 | Tsuboyama et al. | 350/350 S |
| 5,082,587 | 1/1992 | Janulis | 252/299.01 |
| 5,212,575 | * 5/1993 | Kojima et al. | 359/82 |
| 5,262,082 | 11/1993 | Janulis et al. | 252/299.01 |
| 5,282,068 | 1/1994 | Inaba | 359/54 |
| 5,641,427 | 6/1997 | Shinjo et al. | 252/299.01 |
| 6,154,265 | * 11/2000 | Kamio et al. | 349/122 |

FOREIGN PATENT DOCUMENTS

| | | | |
|---|---|---|---|
| 0 255 236 | * | 2/1988 | (EP) . |
| 0 360 521 | * | 3/1990 | (EP) . |
| 0 646 636 | * | 4/1995 | (EP) . |

(List continued on next page.)

OTHER PUBLICATIONS

Schadt & Helfrich, Appl. Phys. Lett., 18 (4), pp. 127–128 (1971).
Chandani et al., J.J.A.P. 27, pp. L729–L732 (1988).
Marc D. Radcliffe et al., 4th Int'l. FLC Conf., p. 46 (1993).
"Structures & Properties of FLC," A.Fukuda, Carona–sha Publ. Co. (1990).
Future Liquid Crystal Display and its materials, A.Fukuda, KKCMC (1992).

*Primary Examiner*—Shean C. Wu
(74) *Attorney, Agent, or Firm*—Fitzpatrick, Cella, Harper & Scinto

(57) ABSTRACT

A liquid crystal device is constituted by a pair of electrode plates and a liquid crystal composition disposed between the electrode plates. At least one of the electrode plates comprises a light-transmissive substrate, a plurality of electrodes including principal electrodes and auxiliary electrodes supported on the light-transmissive substrate, and an insulating layer. Each auxiliary electrode is disposed between an associated principal electrode and the light-transmissive substrate so as to be electrically connected with at least a part of the associated principal electrode, and the auxiliary electrodes being disposed with spacings therebetween which are filled with the insulating layer. The liquid crystal composition comprises at least one species of a fluorine-containing mesomorphic compound comprising a fluorocarbon terminal portion and a hydrocarbon terminal portion, the terminal portions being connected with a central core, and having smectic mesophase or latent smectic mesophase. The combination of the above specific cell structure and the specific liquid crystal composition is effective in improving display quality (e.g., contrast) while minimizing a voltage waveform deformation.

20 Claims, 9 Drawing Sheets

FOREIGN PATENT DOCUMENTS

| | | |
|---|---|---|
| 56-107216 | 8/1981 | (JP) . |
| 59-193426 | 11/1984 | (JP) . |
| 59-193427 | 11/1984 | (JP) . |
| 60-156046 | 8/1985 | (JP) . |
| 60-156047 | 8/1985 | (JP) . |
| 2142753 | 5/1990 | (JP) . |
| 2-165121 | 6/1990 | (JP) . |
| 4-55823 | 2/1992 | (JP) . |
| 0 473 168 | 3/1992 | (JP) . |
| 4-280227 | 10/1992 | (JP) . |
| 619497 | 8/1994 | (JP) . |
| 9322396 | 11/1993 | (WO) . |

* cited by examiner

LIQUID CRYSTAL DEVICE AND LIQUID CRYSTAL APPARATUS

FIELD OF THE INVENTION AND RELATED ART

The present invention relates to a liquid crystal device used as, e.g., terminal displays for computers, various flat panel displays for word processors, typewriters and television receivers, view finders for video cameras, light valves for projectors, and light valves for liquid crystal printers. The present invention also relates to a liquid crystal apparatus using the liquid crystal device.

The most popular and extensively used display may be CRTs (cathode ray tubes) which have been widely used for displaying motion (moving) pictures of television and video tape recorders or as monitor displays for personal computers. Based on the operation characteristic, the CRT is accompanied with difficulties such that the recognizability of a static image is lowered due to flickering and scanning fringes caused by an insufficient resolution, and the fluorescent member is deteriorated due to burning. Further, it has been recently found that electromagnetic wave emitted from CRTs can adversely affect human bodies and health of VDT (video display terminal) operators. Further, the CRT structurally has a large rearward space behind the display surface, so that the space economization in offices and at home may be obstructed thereby.

As a type of device solving such problems of the CRT, there has been known a liquid crystal device, including a type using a twisted nematic (TN) liquid crystal as disclosed by M. Schadt and W. Helfrich, "Applied Physics Letters", Vol. 18, No. 4 (Feb. 17, 1971), pp. 127–128.

The liquid crystal device using a TN-liquid crystal includes a simple matrix-type liquid crystal device which is advantageous from a viewpoint of production cost. This type of liquid crystal device is however accompanied with a problem that it is liable to cause crosstalk when driven in a multiplex manner by using an electrode matrix of a high pixel density, and therefore the number of pixels is restricted.

In contrast with such a simple matrix-type liquid crystal device, a TFT-type liquid crystal device has been developed in recent years, wherein each pixel is provided with and driven with a TFT (thin film transistor). As a result, the problems of crosstalk and response speed can be solved but, on the other hand, a larger area device of the type poses an extreme difficulty in industrial production thereof without inferior pixels. Further, even if such production is possible, the production cost can be increased enormously.

For providing improvements to the above-mentioned difficulties of the conventional types of liquid crystal devices, a liquid crystal device of the type which controls transmission of light in combination with a polarizing device by utilizing a refractive index anisotropy of ferroelectric (or chiral smectic) liquid crystal molecules, has been proposed by Clark and Lagerwall (Japanese Laid-Open Patent Application (JP-A) 56-107216, U.S. Pat. No. 4,367,924). The ferroelectric liquid crystal generally has chiral smectic C phase (SmC*) or H phase (SmH*) in a specific temperature range and, in the phase, shows a property of assuming either one of a first optically stable state and a second optically stable state in response to an electric field applied thereto and maintaining such a 'state in the absence of an electric field, namely bistability, and also have a very quick response speed because it causes inversion switching based on its spontaneous polarization. Thus, the ferroelectric liquid crystal develops bistable states showing a memory characteristic and further has an excellent viewing angle characteristic. Accordingly, the ferroelectric liquid crystal is considered to be suitable for constituting a display device or a light valve of a high speed, a high resolution and a large area. Further, an anti-ferroelectric liquid crystal device using a chiral smectic liquid crystal showing three stable states has been proposed recently by Chandani, Takezoe, et al (Japanese Journal of Applied Physics, Vol. 27 (1988), pp. L729-L732).

Such a chiral smectic liquid crystal is accompanied with problems, such as the occurrence of zigzag-shaped alignment defects and twisting of liquid crystal molecules between a pair of substrates (called "splay alignment") leading to a lowering in contrast (as described in, e.g., "Structures and Properties of Ferroelectric Liquid Crystals" authored by Atsuo Fukuda and Hideo Takezoe; Corona Sha Publishing Co. Ltd., (1990)). The defects are considered to be attributable to a layer structure of a chiral smectic liquid crystal including two types of chevron structures between a pair of substrates.

A known method of solving the above problem is to provide the liquid crystal molecules with a pretilt angle, thereby uniformizing the chevron layer structure in one direction so that the twisting state (splay alignment state) of liquid crystal molecules between the pair of substrate is made more unstable than a uniform alignment state in respect of elastic energy.

Another method is to form a liquid crystal layer structure not of the bent chevron structure but of a bookshelf structure wherein smectic layers are little inclined but aligned generally in parallel or a structure close thereto, thereby removing the zigzag defects and realizing the uniform alignment to provide a high contrast (as disclosed in, e.g., "Future Liquid Crystal Display and Its Materials" edited by Atsuo Fukuda; K.K. C.M.C., (1992)). In a method of realizing a bookshelf layer structure, a naphthalene-based liquid crystal material is used. In this case, however, the resultant tilt angle is on the order of 10 deg. and is much smaller than 22.5 deg. which theoretically provides a maximum transmittance, so that the device can exhibit only a low transmittance. Another method is to apply an external electric field to a liquid crystal device containing a liquid crystal in a chevron structure to induce a bookshelf structure, but the resultant structure is rather unstable against an external stimulation, such as a temperature fluctuation.

As a liquid crystal material providing a bookshelf structure or a structure close thereto, a mesomorphic compound having a perfluoroalkyl ether terminal chain (U.S. Pat. No. 5,262,082), a liquid crystal composition containing such a mesomorphic compound (Marc D. Raddiffe et al., The 4th International Ferroelectric Liquid Crystal Conference, p-46 (1993)), etc., have been proposed. By using such a liquid crystal material, it is possible to provide a bookshelf structure or a similar structure having a small layer inclination angle with an optimum tilt angle without using an external field, such as an electric field.

However, such a liquid crystal material does not generally assume cholesteric phase, thus being liable to fail in providing a sufficiently good alignment state.

A liquid crystal device comprises a pair of electrode plats each including a substrate and at least an electrode formed thereon, and a liquid crystal disposed between the electrode plates. The electrode generally comprises transparent electrodes of, e.g., ITO (indium tin oxide). Such transparent electrodes are required to have a high transmittance of light and a low (electrical) resistivity. If the light transmittance of the transparent electrodes, etc. is low, a resultant contrast is undesirably lowered since the liquid crystal device is used as, e.g., displays or optical shutters by controlling the light transmittance. In addition the liquid crystal device may be considered as an electrical circuit providing a capacitive load since the device is used by applying an electric field to a liquid crystal disposed between a pair of electrode plates. Accordingly, a problem of voltage waveform deformation (distortion) due to electrical signal delay with respect to the transparent electrodes cannot be neglected.

However, the transparent electrodes of ITO generally have a fairly high resistivity (sheet resistance=20–400 ohm; volume resistivity=$200 \times 10^{-8}$–$4000 \times 10^{-8}$ ohm.m) when compared with a metallic material (e.g., volume resistance of Al=ca. $3 \times 10^{-8}$ ohm.m).

In order to reduce the resistivity, it may be possible to increase the thickness of the transparent electrodes, but the formation of such thick transparent electrodes is not practicable due to a lowering in light transmittance. As a result, such transparent electrodes having a high resistivity have caused a problem of voltage waveform deformation due to electrical signal delay along with increases in size and resolution of an effective optical modulation region (or display region) of the liquid crystal device. Particularly, a surface-stabilized ferroelectric liquid crystal device (SSFLCD), such as a chiral smectic liquid crystal device, having a small cell thickness of 1–3 $\mu$m, which is $\frac{1}{3}$14 $\frac{1}{5}$ of that of the conventional TN-type liquid crystal device, has encountered a problem of a larger voltage waveform deformation even when the SSFLCD employs electrode plates identical to those of the TN-type liquid crystal device.

In order to solve the above-mentioned problems, it has been practiced to form metal electrodes of Cr (volume resistivity=ca. $15 \times 10^{-8}$ ohm.m) or Mo (volume resistivity= ca. $6 \times 10^{-8}$ ohm.m) along associated transparent electrodes of ITO, respectively (as disclosed in Japanese Patent Publications (JP-B) 6-19497).

However, the above practice (the formation of metal electrodes) have still left such problems that the thickness of the resultant metal electrodes cannot be made large since the cell thickness (or the thickness of a liquid crystal layer) is limited and that a boundary between an electrode plate and a liquid crystal becomes uneven due to the formation of the metal electrodes thereby to cause alignment defects. These problems become more noticeable in the chiral smectic liquid crystal device having a clear smectic layer structure. Particularly, a liquid crystal device using a liquid crystal composition containing a fluorine-containing liquid crystal (mesomorphic) compound assuming no cholesteric phase is liable to fail to effect satisfactory optical modulation due to an occurrence of alignment defects. Further when such a liquid crystal composition is used for displaying motion pictures, the metal electrodes have not been readily made thick to the extent that display failure due to the voltage waveform distortion can be remedied.

SUMMARY OF THE INVENTION

In view of the above mentioned problems, an object of the present invention is to provide a liquid crystal device using a liquid crystal composition capable of stably showing a layer structure of a bookshelf structure or a structure, having a small layer inclination angle, closer to the bookshelf structure, and capable of providing improved properties such as excellent alignment characteristic, high contrast, high resolution, high brightness, high reliability, and good display characteristic for motion pictures, based on realization of a low-resistance electrode and a flattened boundary between a liquid crystal layer and an electrode plate at the same time.

Another object of the present invention is to provide a liquid crystal apparatus using the liquid crystal device.

According to the present invention, there is provided a liquid crystal device, comprising: a pair of electrode plates and a liquid crystal composition disposed between the electrode plates, wherein at least one of the electrode plates comprises a light-transmissive substrate, a plurality of electrodes including principal electrodes and auxiliary electrodes supported on the light-transmissive substrate, and an insulating layer; each auxiliary electrode being disposed between an associated principal electrode and the light-transmissive substrate so as to be electrically connected with at least a part of the associated principal electrode, and the auxiliary electrodes being disposed with spacings therebetween which are filled with the insulating layer, and the liquid crystal composition comprises at least one species of a fluorine-containing mesomorphic compound comprising a fluorocarbon terminal portion and a hydrocarbon terminal portion, the terminal portions being connected with a central core, and having smectic mesophase or latent smectic mesophase.

According to another aspect of the present invention, there is provided a liquid crystal device, comprising: a pair of first and second electrode plates and a liquid crystal composition disposed between the electrode plates, wherein the first electrode plates comprises a light-transmissive substrate, a plurality of electrodes including principal electrodes and auxiliary electrodes supported on the light-transmissive substrate, and an insulating layer; each auxiliary electrode being disposed between an associated principal electrode and the light-transmissive substrate so as to be electrically connected with at least a part of the associated principal electrode, and the auxiliary electrodes being disposed with spacings therebetween which are filled with the insulating layer, and the second electrode plate comprises a light-transmissive substrate and a plurality of electrodes including principal electrodes and auxiliary electrodes disposed on the light-transmissive substrate, each auxiliary electrode being disposed between an associated principal electrode and the light-transmissive substrate so as to be electrically connected with at least a part of the associated principal electrode, and each principal electrode contacting the light-transmissive substrate at a spacing between an associated auxiliary electrode and an adjacent auxiliary electrode.

According to a further aspect of the present invention, there is provided a liquid crystal device, comprising: a pair of first and second electrode plates and a liquid crystal composition disposed between the electrode plates, wherein the first electrode plates comprises a light-transmissive substrate, a plurality of electrodes including principal electrodes and auxiliary electrodes supported on the light-transmissive transmissive substrate, and an insulating layer; each auxiliary electrode being disposed between an associated principal electrode and the light-transmissive substrate so as to be electrically connected with at least a part of the associated principal electrode, and the auxiliary electrodes being disposed with spacings therebetween which are filled with the insulating layer, and the second electrode plate comprises a light-transmissive substrate, a color filter disposed on the light-transmissive substrate, a flattening layer disposed on the color filter, and a plurality of electrodes including principal electrodes and auxiliary electrodes disposed on the flattening layer; each auxiliary electrode being disposed between an associated principal electrode and the flattening layer so as to be electrically connected with at least a part of the associated principal electrode, and each principal electrode contacting the flattening layer at a spacing between an associated auxiliary electrode and an adjacent auxiliary electrode.

The present invention further provides liquid crystal apparatus including the above-mentioned liquid crystal devices, respectively.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinbelow, the present invention will be described specifically with reference to the drawings.

Figure 1:
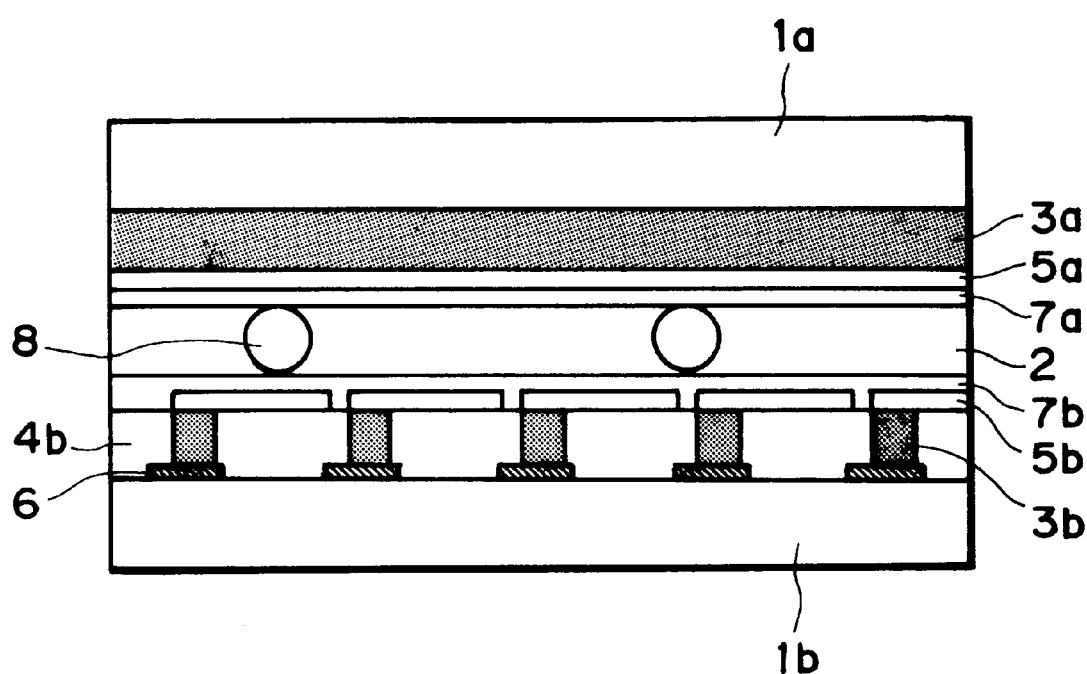
FIG. 1 is a schematic sectional view of an embodiment of the liquid crystal device according to the present invention.

FIG. 1 shows an embodiment of the liquid crystal device according to the present invention.

Referring to FIG. 1, the liquid crystal device includes a pair of electrode plates and a liquid crystal composition 2 disposed between the electrode plates.

Each electrode plate principally comprises: a light-transmissive substrate 1a (or 1b); a plurality of patterned auxiliary electrodes 3a (or 3b) disposed on the substrate 1a (or 1b) with spacings; an insulating layer 4a (not shown) (or 4b) disposed so as to fill the spacings between the auxiliary electrodes 3a (or 3b); a plurality of principal electrodes 5a (or 5b) disposed on the auxiliary electrodes 3a (or 3b) and the insulating layer 4a (or 4b) so as to be electrically connected with associated auxiliary electrodes, respectively; and an alignment control Slayer 7a (or 7b) disposed so as to cover the principal electrodes 5a (or 5b).

In this embodiment, one of the electrode plates (lower electrode plates shown in FIG. 1) further comprises a masking (light-interrupting) member 6 disposed between the substrate 1b and the auxiliary electrodes 3b. The masking member 6 may also be disposed between the substrate 1a and the auxiliary electrodes 3a of the other electrode plate, as desired. In the present invention, it is possible to omit the masking member 6.

The electrode plates described above are spaced by spacer beads 8 together with the liquid crystal composition layer 2, thus providing a predetermined cell gap. A periphery of the liquid crystal composition layer 2 is sealed by a sealing member (not shown) together with the pair of electrode plates.

In this embodiment, the substrate 1a side corresponds to a light-inputting side (where a backlight device is disposed in the case of a display device) and the substrate 1b side corresponds to a light-outputting side (a viewer side in the case of a display device).

The light-transmissive substrate 1a (1b) may comprise any sheet or plate of glass or plastic generally used as a substrate for a liquid crystal device if it has a sufficient light-transmissive property and smooth surface. Specifically, the glass sheet (plate) may preferably be used in view of its excellent light-transmissive property, a processability for providing a smooth surface, and a strength. Examples of such a glass sheet may include a ca. 0.7–1.1 mm thick sheet of a blue plate glass which has been double side-polished to improve parallelism.

The auxiliary electrodes 3a (3b) may comprise an appropriate low-resistance material and may preferably be formed in a thickness of at least 0.3 $\mu$m. In this embodiment, the auxiliary electrodes 3a directly formed on the light-transmissive substrate 1a may preferably comprise a material excellent in adhesiveness with the substrate 1a.

Examples of the material for the auxiliary electrodes 3a (3b) may include a metallic material or a resin containing electroconductive fine particles dispersed therein. The metallic material may include aluminum, chromium, molybdenum, tantalum, nickel, copper and alloys of these metals (such as molybdenum-tantalum alloy and aluminum-silicon-copper alloy). The auxiliary electrodes 3a (3b) may be formed in an appropriate thickness (height) depending on properties of the material used (particularly, electrical resistance (resistivity) and film-forming properties). In a preferred embodiment, the auxiliary electrodes 3a (3b) may have a thickness of 0.3–3 $\mu$m. Further, the auxiliary electrodes 3a (3b) may preferably have an electrical resistance lower than that of the principal electrodes 7a (7b) and may be formed in plural layers comprising different materials.

The insulating layer 4a (4b) may suitably comprise a polymeric material showing a high transmittance (of light). Examples of such a material may include a ultraviolet (UV)-curable resin (a resin cured by irradiation with UV light), a thermosetting resin, a room temperature setting (curing) resin, a reactive-type curing resin consisting of two liquid components, and other polymeric materials free from a resinous component. Of these materials, the UV-curable resin may preferably be used in view of its excellent molding properties.

The UV-curable resin may generally comprise a resin composition of acrylate-type or epoxy-type including a UV-curable monomer or oligomer and a photopolymerization initiator. Such a resin composition may preferably possesses resistances to heat, chemicals and washing(s) in view of production steps, such as a step of forming transparent (principal) electrodes and a step of baking an alignment film. More specifically, the resin composition may, e.g., include one comprising a reactive oligomer, as a main component, into which a heat-resistant molecular structure is introduced and one improved in crosslink density by using a polycyclic monomer.

The insulating layer 4a (4b) may preferably have a refractive index substantially identical to that of the light-transmissive substrate 1a (1b) in order to minimize reflection and refraction at the boundary therebetween. More specifically, the difference in refractive index between the insulating layer 4a (4b) and the substrate 1a (1b) may preferably be within ±0.1, more preferably be within ±0.05.

In this embodiment, a distance between the surface of the auxiliary electrodes 3a (3b) (i.e., the boundary between the auxiliary electrodes 3a (3b) and the principal electrodes 5a (5b)) and the surface of the substrate 1a (1b) may be equal to or larger than a distance between the surface of the insulating layer 4a (4b) and the surface of the substrate 1a (1b) (i.e., a thickness of the insulating layer 4a (4b)). For example, the auxiliary electrodes 3a (directly formed on the substrate 1a as shown in FIG. 1) may preferably have a thickness not smaller than that of the insulating layer 4a (not shown), whereby it is possible to readily effect an electrical connection between the principal electrodes 5a and the auxiliary electrodes 3a.

In order to ensure a surface flatness (or smoothness) of the electrode plate used, the difference between the above-mentioned distances may preferably be controlled to be at most 200 nm. Further, the surface of the insulating layer 4a (4b) may preferably be substantially flat or even. Specifically, such a insulating layer 4a (4b) may preferably have a surface unevenness of within ±30 nm.

The principal electrodes 5a (5b) may preferably comprise transparent electrodes of, e.g., indium oxide, tin oxide or indium tin oxide (ITO). The transparent electrodes of ITO (indium:tin=85:15–97:3) may more preferably be employed as the principal electrodes 5a (5b). In the present invention, the principal electrodes 5a (5b) and the associated auxiliary electrodes 3a (3b) together constitute a plurality of electrodes for the associated electrode plate.

The masking (light-interrupting) member 6 may comprise a metallic compound (e.g., metal or metal oxide) and a resin, showing a low transmittance of light. The masking member 6 may preferably be optically black in view of prevention of reflection. In the case of using an electroconductive masking member 6, it is possible to more effectively minimize the voltage waveform distortion described above through an electrical connection with the associated auxiliary electrodes 3b.

The alignment control layer 7a (7b) may comprise films of an organic material and an inorganic material. Examples of such an organic material may include: polyimide, polypyrrole, polyvinyl alcohol, polyamide-imide, polyester-imide, polyparaxylylene, polyester, polycarbonate, polyvinyl acetal, polyvinyl chloride, polyamide, polystyrene, polyaniline, celllosic resin, acrylic resin and melamine resin.

The inorganic film may, e.g., be an SiO film formed by an oblique vapor deposition method or a film of polysiloxane.

At least one of the alignment control layers 7a and 7b may preferably be subjected to a uniaxial aligning treatment, such as rubbing. In a preferred embodiment, a combination of the alignment control layers 7a and 7b comprises a uniaxial aligning-treated film of, e.g., nylon or polyimide and a layer of, e.g., silane coupling agent, polyimide or polysiloxane, which has not been subjected to a uniaxial aligning treatment. Further, the alignment control layer 7a (7b) may be formed in two-layer structure the surface of which contacting the liquid crystal composition 2 has been subjected to the uniaxial aligning treatment.

In the present invention, as the material for the uniaxial aligning-treated (particularly rubbing-treated) alignment control layer 7a (7b), a polyimide film formed by applying a polyamic acid (polyimide precursor) solution and hot-baking the applied (coating) layer may preferably be used since the polyimide film is readily formed and shows a high alignment control ability.

Such a polyimide may preferably have a molecular structure excellent in rigidity (or stiffness), linearity and crystallinity so as to readily align liquid crystal molecules (of the liquid crystal composition 2).

More specifically, the alignment control layer 7a (7b) may preferably comprise a film of polyimide represented by the following formula as a recurring unit.

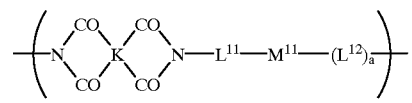

in which

K is 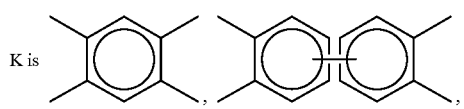, 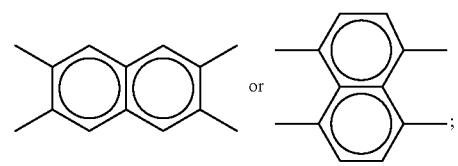 or ;

$L^{11}$ and $L^{12}$ independently denote , or an alkylene group having 1–20 carbon atoms;

$M^{11}$ is a single bond or —O—; and a is 0, 1 or 2.

Specific examples of the polyimide of the above formula include those having the following recurring units shown below.

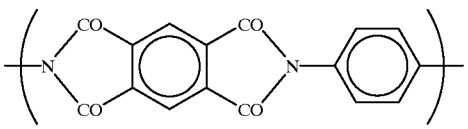

-continued

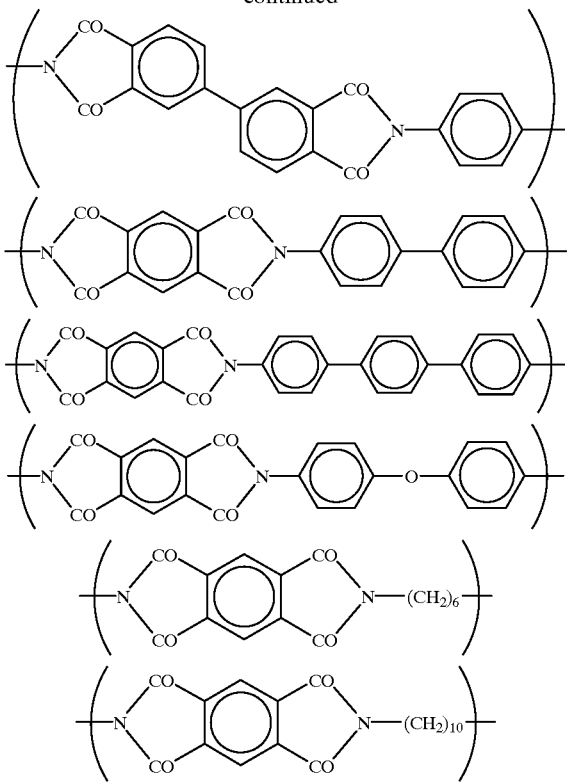

In the present invention, it is possible to form a 20–300 nm thick insulating film, for short-circuit prevention, of $Ta_2O_5$, $SiO_2$ or $TiO_2$ between the alignment control layer 7a (7b) and the principal electrodes 5a (5b).

The liquid crystal composition (the composition 2 shown in FIG. 1) used in the present invention may desirably contain a fluorine-containing mesomorphic compound which preferably has a structure including a fluorocarbon terminal portion and a hydrocarbon terminal portion connected by a central core and has smectic phase or latent smectic phase. The term "latent smectic phase" refers to a property of a compound concerned that the compound alone does not exhibit smectic phase but can be a component compatibly contained in smectic phase of a liquid crystal composition.

In a preferred class of the fluorine-containing mesomorphic compound, the fluorocarbon terminal portion may preferably be:

a group represented by the formula $-D^1-C_{xa}F_{2xa}-X$, where xa is 1–20; X is —H or —F; $-D^1-$ is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—$N(C_{pa}H_{2pa+1})$—$SO_2$— or —$(CH_2)_{ra}$—$N(C_{pa}H_{2pa+1})$—CO—; where ra and rb are independently 1–20; and pa is 0–4; or a group represented by $-D^2-(C_{xb}F_{2xb}-O)_{za}-C_{ya}F_{2ya+1}$, wherein xb is 1–10 independently for each $(C_{xb}F_{2xb}-O)$; ya is 1–10; za is 1–10; $-D^2-$ is —CO—O—$C_{rc}H_{2rc}$—, —O—$C_{rc}H_{2rc}$—$C_{rc}H_{2rc}$—, —O—$(C_{sa}H_{2sa}-O)_{ta}$—$C_{rd}H_{2rd}$—, —O—$SO_2$—, —$SO_2$—, —$SO_2$—$C_{rc}H_{2rc}$—, —$C_{rc}H_{2rc}$—$N(C_{pb}H_{2pb+1})$—$SO_2$—, —$C_{rc}H_{2rc}$—$N(C_{pb}H_{2pb+1})$—CO—, or a covalent bond, where rc and rd are independently 1–20; sa is independently 1–10 for each $(C_{sa}H_{2sa}-O)$; ta is 1–6; and pb is 0–4.

In the fluorine-containing mesomorphic used in the present invention, the mesomorphic compound may preferably have a central core comprising at least two rings independently selected from aromatic ring, heteroaromatic ring, cycloaliphatic ring, or substituted aromatic ring, substituted heteroaromatic ring, and substituted cycloaliphatic ring, which may be connected one with another by a covalent bond or by groups selected from —COO—, —COS—, —HC=N—, —COSe—. Rings may be fused or non-fused. Heteroatoms within the heteroaromatic ring comprise at least one atom selected from N, O or S. Non-adjacent methylene groups in cycloaliphatic rings may be substituted by O atom. The central core may preferably comprise a benzene ring and a pyrimidine ring.

It is particularly preferred to use a fluorine-containing mesomorphic compound of the following general formula (I) or (II):

Formula (I):

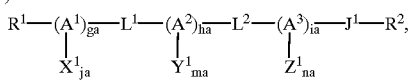

wherein $A^1$, $A^2$ and $A^3$ are each independently

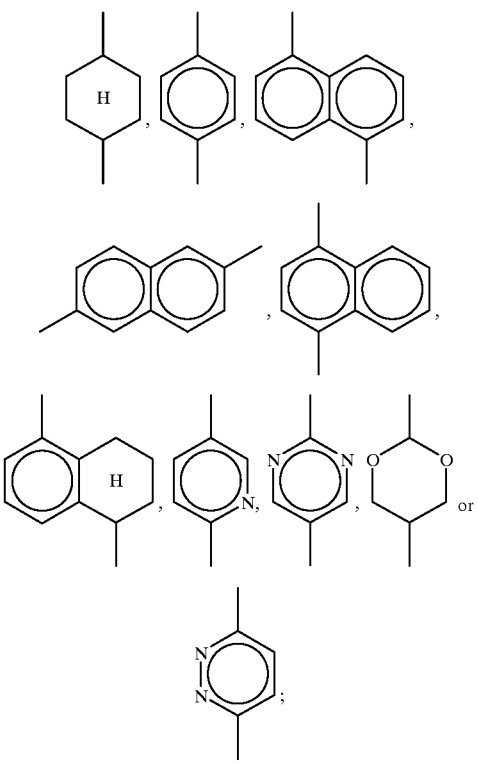

ga, ha and ia are independently an integer of 0–3 with the proviso that the sum of ga+ha+ia be at least 2;

$L^1$ and $L^2$ are each independently a covalent bond —CO—O—, —O—CO—, —COS—, —S—CO—, —CO—Se—, —Se—CO—, —CO—Te—, —Te—CO—, —$CH_2CH_2$—, —CH=CH—, —C≡C—, —CH=N—, —N=CH—, —$CH_2$—O—, —O—$CH_2$—, —CO— or —O—;

$X^1$, $Y_1$ and $Z^1$ are each a substituent of $A^1$, $A^2$ and $A^3$, respectively, and each $X^1$, y1 and $Z^1$ are independently —H, —Cl, —F, —Br, —I, —OH, —$OCH_3$, —$CH_3$, —CN or —$NO_2$;

each ja, ma and na are independently an integer of 0–4;

$J^1$ is CO—O—$(CH_2)_{ra}$—, —O—$(CH_2)_{ra}$—, —$(CH_2)_{ra}$—, —O—$SO_2$—, —$SO_2$—, $SO_2$—$(CH_2)_{ra}$—, —$(CH_2)_{ra}$—O$(CH_2)_{rb}$, —$(CH_2)_{ra}$—$N(C_{pa}H_{2pa+1})$—$SO_2$— or —$(CH_2)_{ra}$—$N(C_{pa}H_{2pa+1})$—CO—; where ra and rb are independently 1–20, and pa is 0–4;

$R^1$ is —O—$C_{qa}H_{2qa}$—O—$C_{qb}H_{2qb+1}$, —$C_{qa}H_{2qa}$—O—$C_{qb}H_{2qb+1}$, —$C_{qa}H_{2qa}R^3$, —O—$C_{qa}H_{2qa}$—$R^3$, —CO—O—$C_{qa}H_{2qa}$—$R^3$, or —O—CO—$C_{qa}H_{2qa}R^3$ which may be either straight chain or branched; where $R^3$ is —O—CO—$C_{qb}H_{2qb+1}$, —CO—O—$C_{qb}H_{2qb+1}$, —H, —Cl, —F, —$CF_3$, —$NO_2$ or —CN; and qa and qb are independently 1–20;

$R^2$ is $C_{xa}F_{2xa}$—X, where X is —H or —F, xa is an integer of 1–20.

Formula (II):

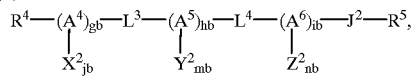

wherein $A^4$, $A^5$ and $A^6$ are each independently

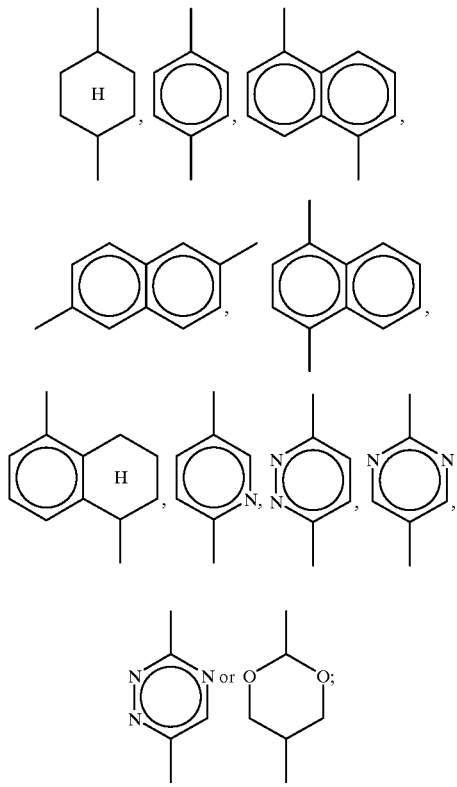

gb, hb and ib are each independently an integer of 0–3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —$(CH_2CH_2)^{ka}$— (ka is 1–4), —CH=CH—, —C≡C—, —CH=N—, —N=CH—, —$CH_2$—O—, —O—$CH_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —$OCH_3$, —$CH_3$, —$CF_3$, —O—$CF_3$, —CN or —$NO_2$; each jb, mb and nb are independently an integer of 0–4;

$J^2$ is —CO—O—$C_{rc}H_{2rc}$—, —O—$C_{rc}H_{2rc}$—, —$C_{rc}H_{2rc}$—, —O—$(C_{sa}H_{2sa}$—O$)_{ta}$—$C_{rd}H_{2rd}$—, —O—$SO_2$—, —$SO_2$—, $SO_2$—$C_{rc}H_{2rc}$—, —$C_{rc}H_{2rc}$—$N(C_{pb}H_{2pb+1})$—$SO_2$— or —$C_{rc}H_{2rc}$—$N(C_{pb}H_{2pb+1})$—CO—; rc and rd are independently 1–20; sa is independently 1–10 for each $(C_{sa}H_{2sa}$—O), ta is 1–6; pb is 0–4;

$R^4$ is —O—$(C_{qc}H_{2qc}$—O$)_{wa}$—$C_{qd}H_{2qd+1}$, —$(C_{qc}H_{2qc}$—O$)_{wa}$—$C_{qd}H_{2qd+1}$, —$C_{qc}H_{2qc}$—$R^6$, —O—$C_{qc}H_{2qc}$—$R^6$, —CO—O—$C_{qc}H_{2qc}$—$R^6$, or O—CO—$C_{qc}H_{2qc}$—$R^6$ which may be either straight chain or branched; $R^6$ is —O—CO—$C_{qd}H_{2qd+1}$; —CO—O—$C_{qd}H_{2qd+1}$, —Cl, —F, —$CF_3$, —$NO_2$, —CN or —H; qc and gd are independently an integer of 1–20; wa is an integer of 1–10;

$R^5$ is $(C_{xb}F_{2xb}$—O$)_{za}$—$C_{ya}F_{2ya+1}$, wherein xb is independently 1–10 for each $(C_{xb}F_{2xb}$—O); ya is 1–10; and za is 1–10.

The fluorine-containing mesomorphic compound represented by the formula (I) may be synthesized through processes similar to those descried in JP-A (Kokai) 2-142753 and U.S. Pat. No. 5,082,587. Specific examples of such a mesomorphic compound of the formula (I) may include those (Example Compound Nos. I-1 to I-103) shown below.

I-1

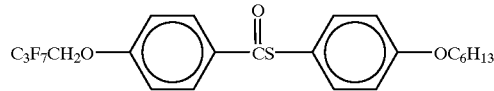

I-2

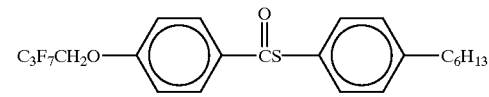

I-3

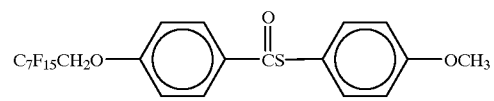

I-4

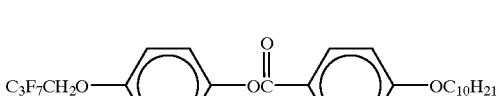

I-5

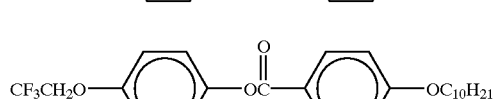

I-6

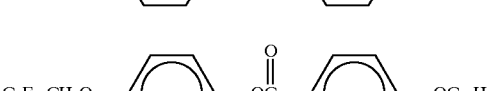

I-7

I-8

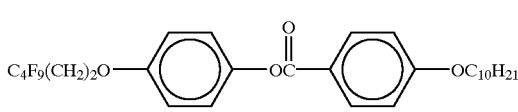

-continued

I-9: H(CF₂)₂CH₂O—C₆H₄—OC(=O)—C₆H₄—OC₁₀H₂₁

I-10: H(CF₂)₆CH₂O—C₆H₄—OC(=O)—C₆H₄—OC₁₀H₂₁

I-11: H(CF₂)₁₀CH₂O—C₆H₄—OC(=O)—C₆H₄—OC₆H₁₃

I-12: C₈F₁₇(CH₂)₁₁O—C₆H₄—OC(=O)—C₆H₄—OC₁₀H₂₁

I-13: CF₃CH₂O—C₆H₄—OC(=O)—C₆H₄—OC₄H₉

I-14: C₅F₁₁CH₂O—C₆H₄—OC(=O)—C₆H₄—OC₄H₉

I-15: C₃F₇CH₂O—C₆H₄—OC(=O)—C₆H₄—OC₆H₁₃

I-16: C₅F₁₁CH₂O—C₆H₄—OC(=O)—C₆H₄—OC₆H₁₃

I-17: C₇F₁₅CH₂O—C₆H₄—OC(=O)—C₆H₄—OC₆H₁₃

I-18: C₃F₇CH₂O—C₆H₄—OC(=O)—C₆H₄—OC₈H₁₇

I-19: C₅F₁₁CH₂O—C₆H₄—OC(=O)—C₆H₄—OC₈H₁₇

I-20: C₇F₁₅CH₂O—C₆H₄—OC(=O)—C₆H₄—OC₈H₁₇

-continued

I-21: CF₃CH₂O—C₆H₄—OC(=O)—C₆H₄—C₁₀H₂₁

I-22: C₅F₁₁CH₂O—C₆H₄—OC(=O)—C₆H₄—C₁₀H₂₁

I-23: C₇F₁₅CH₂O—C₆H₄—OC(=O)—C₆H₄—OC₁₂H₂₅

I-24: CF₃CH₂O—C₆H₄—OC(=O)—C₆H₃(Cl)—OC₈H₁₇

I-25: CF₃CH₂O—C₆H₄—C(=O)O—C₆H₄—OC₆H₁₃

I-26: C₂F₅CH₂O—C₆H₄—C(=O)O—C₆H₄—OC₆H₁₃

I-27: C₃F₇CH₂O—C₆H₄—C(=O)O—C₆H₄—OC₆H₁₃

I-28: C₃F₇CH₂O—C₆H₄—C(=O)O—C₆H₄—OC₇H₁₅

I-29: C₃F₇CH₂O—C₆H₄—C(=O)O—C₆H₄—OC₈H₁₇

I-30: C₃F₇CH₂O—C₆H₄—C(=O)O—C₆H₄—OC₁₀H₂₁

I-31: C₃F₇CH₂O—C₆H₄—C(=O)O—C₆H₄—OC₁₂H₂₅

I-32: C₅F₁₁CH₂O—C₆H₄—C(=O)O—C₆H₄—OC₆H₁₃

I-33 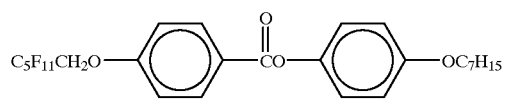
I-34 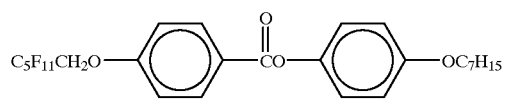
I-35 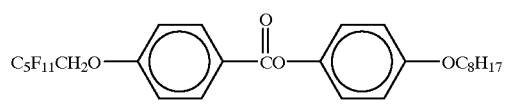
I-36 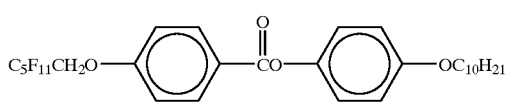
I-37 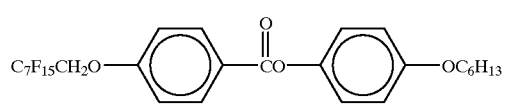
I-38 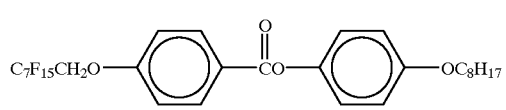
I-39 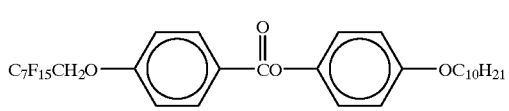
I-40 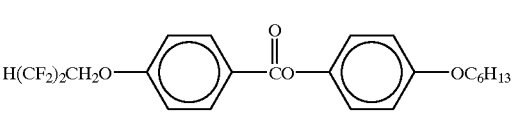
I-41 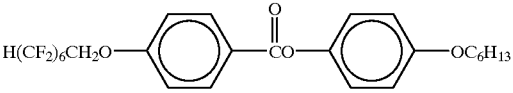
I-42 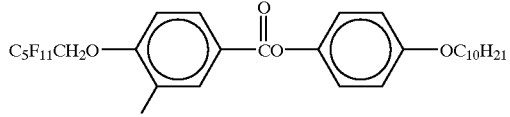
I-43 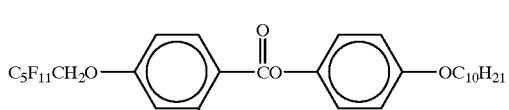
I-44 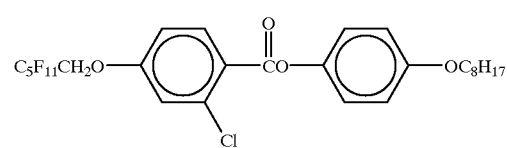
I-45 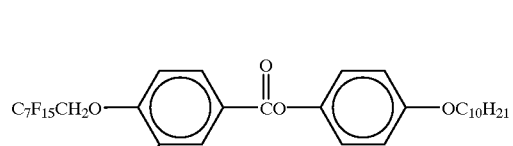
I-46 
I-47 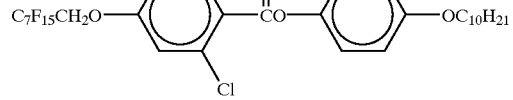
I-48 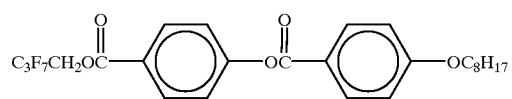
I-49 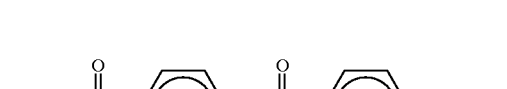
I-50 
I-51 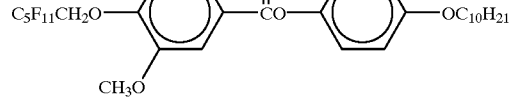
I-52 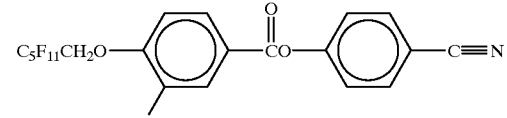
I-53 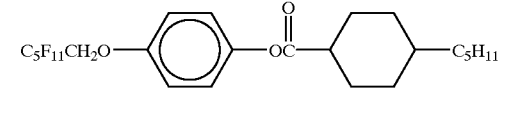

I-54
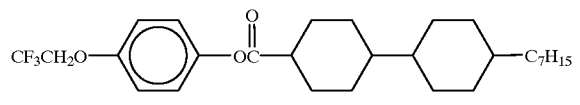
I-55
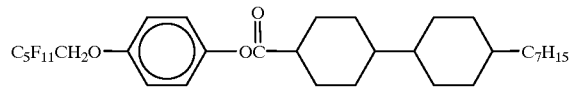
I-56
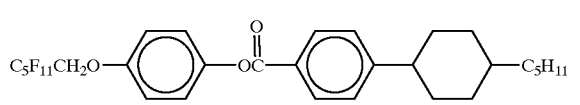
I-57
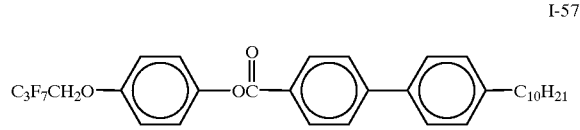
I-58
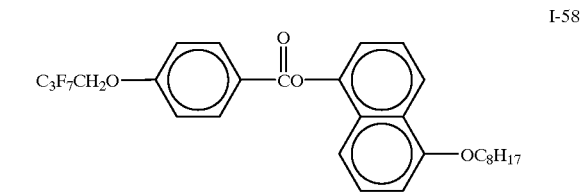
I-59
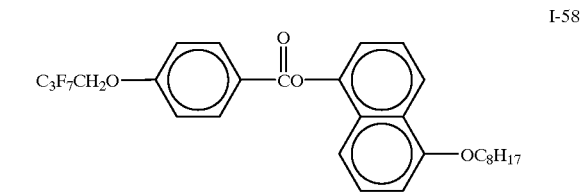
I-60
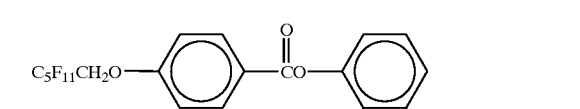
I-61
I-62
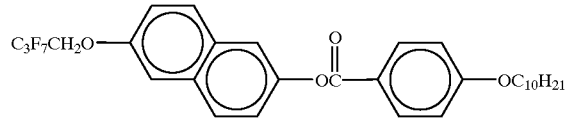
I-63
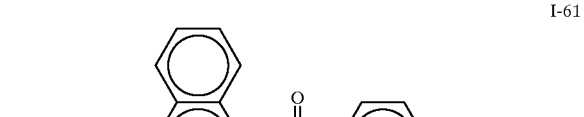
I-64
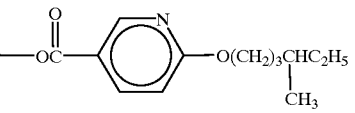
I-65
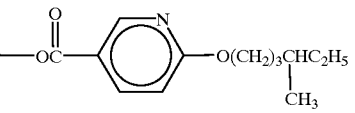
I-66
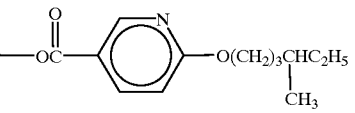
I-67
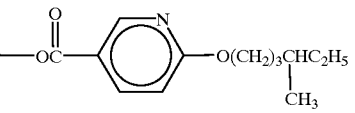
I-68
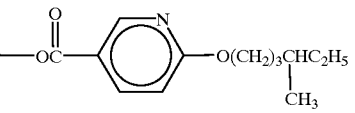
I-69
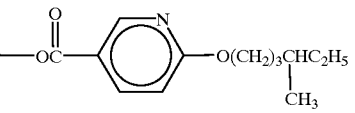
I-70
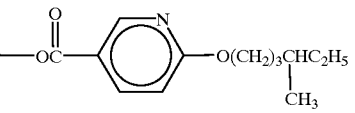
I-71
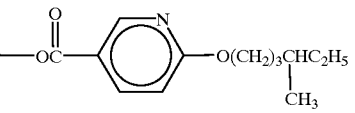
I-72
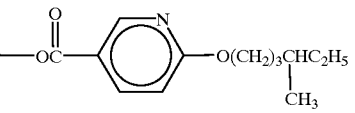
I-73
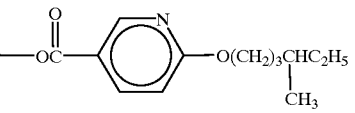
I-74
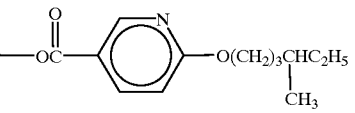

I-75
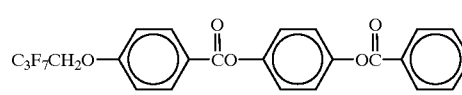
I-76
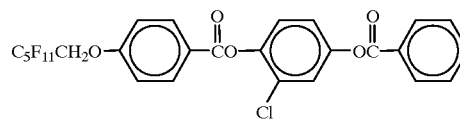
I-77
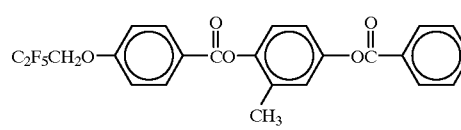
I-78
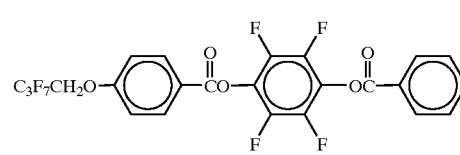
I-79
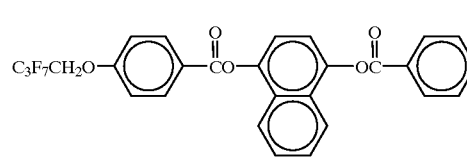
I-80
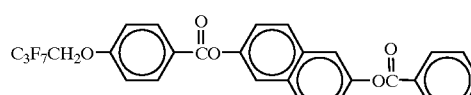
I-81
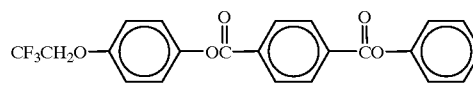
I-82
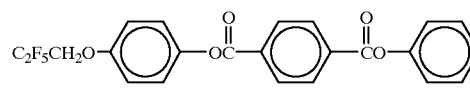
I-83
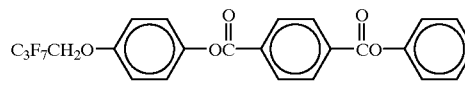
I-84
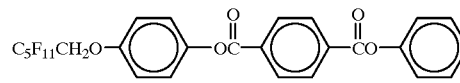
I-85
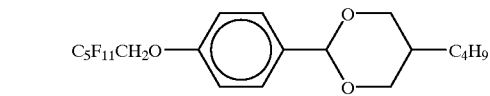
I-86
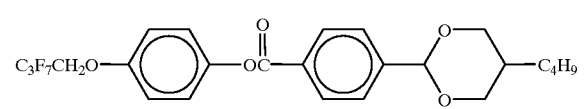
I-87
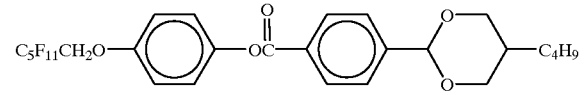
I-88
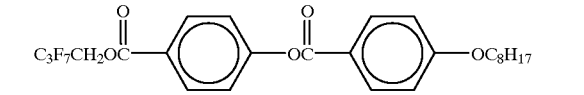
I-89
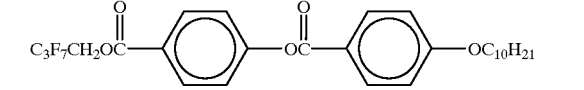
I-90
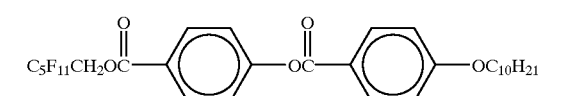
I-91
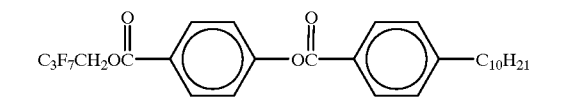
I-92
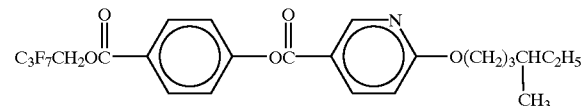
I-93
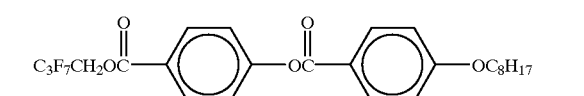
I-94
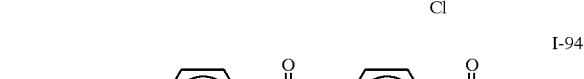
I-95
I-96
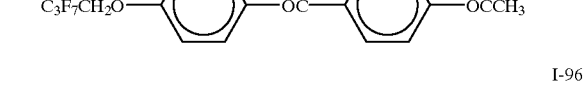

I-97
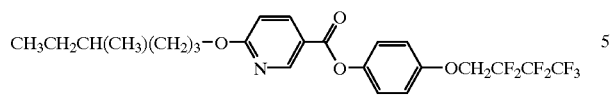
I-98
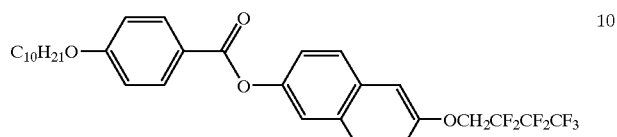
I-99
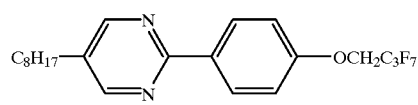
I-100
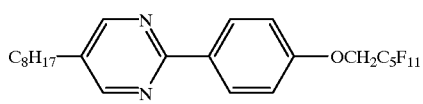
I-102
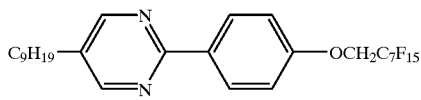
I-103
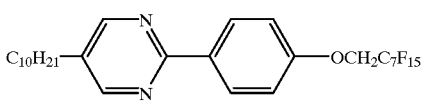
The fluorine-containing mesomorphic compound represented by the formula (II) may be synthesized through processes similar to those described in JP-A (Kohyo) 7-506368 and WO93/22396. Specific examples of such a mesomorphic compound of the formula (II) may include those (Example Compound Nos. II-1 to II-45) shown below.
II-1
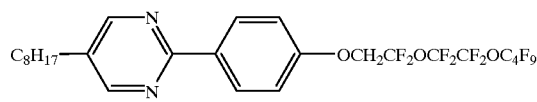
II-2
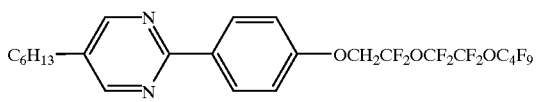
II-3
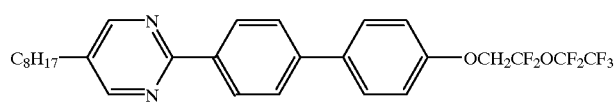
II-4
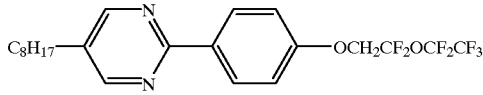
II-5
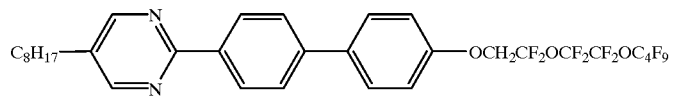
II-6
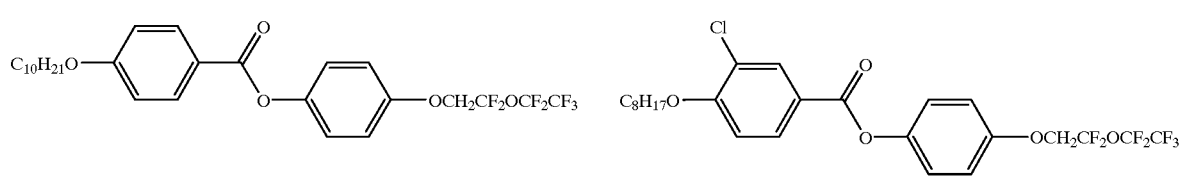
II-7
II-8

-continued
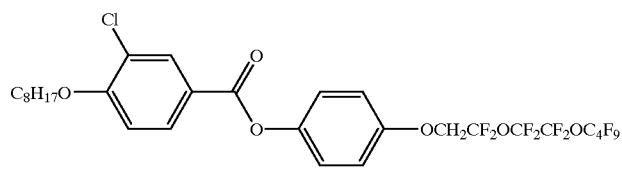
II-9
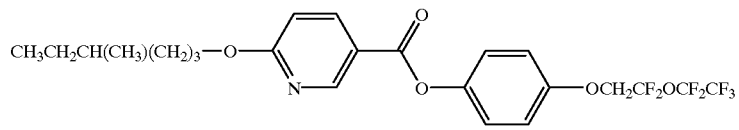
II-10
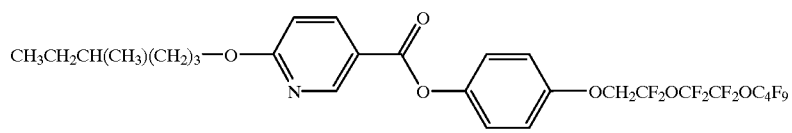
II-11
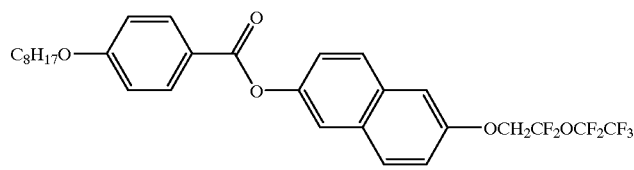
II-12
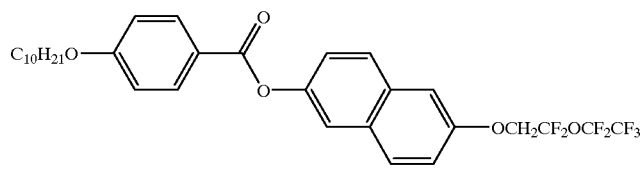
II-13
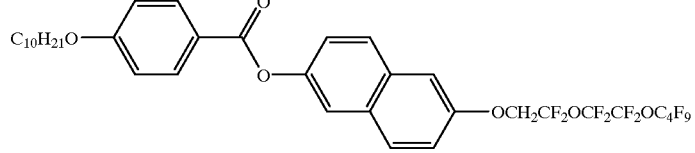
II-14
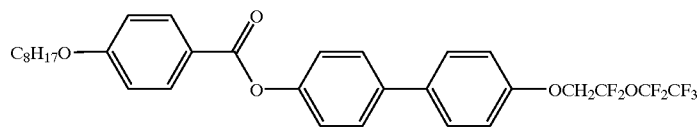
II-15
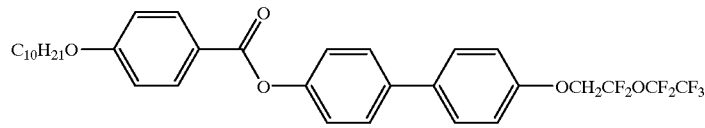
II-16
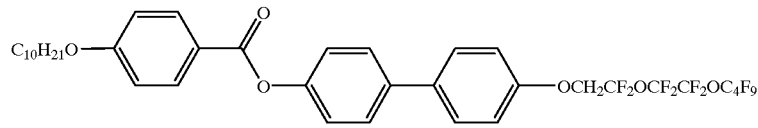
II-17
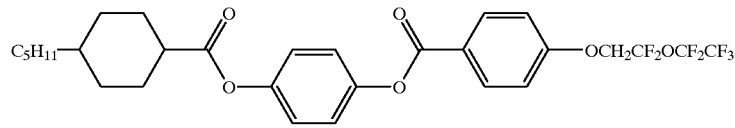
II-18

-continued

II-19: C8H17O–[phenyl(CN)(CN)]–OC(O)–[phenyl]–OCH2CF2OCF2CF3

II-20: C8H17O–[phenyl(F)(F)]–OC(O)–[phenyl]–OCH2CF2OCF2CF3

II-21: C8H17–[pyrimidine]–[phenyl]–OCH2CF2OC2F4OC6F13

II-22: C10H21–[pyrimidine]–[phenyl]–OCH2CF2OC2F4OC6F13

II-23: C8H17–[pyrimidine]–[phenyl]–OCH2C3F6OC4F8OC4F9

II-24: C10H21–[pyrimidine]–[phenyl]–OCH2C3F6OC4F8OC4F9

II-25: C8H17–[pyrimidine]–[phenyl]–OCH2CF2(OC2F4)2OCF3

II-26: C10H21–[pyrimidine]–[phenyl]–OCH2CF2(OC2F4)2OCF3

II-27: C8H17–[pyrimidine]–[phenyl]–OCH2C2F4OC4F9

II-28: C10H21–[pyrimidine]–[phenyl]–OCH2C2F4OC4F9

II-29: C8H17–[pyrimidine]–[phenyl]–OCH2C3F6OC4F9

II-30: C10H21–[pyrimidine]–[phenyl]–OCH2C3F6OC4F9

II-31: C8H17–[pyrimidine]–[phenyl]–OCH2C2F4OC6F13

II-32: C10H21–[pyrimidine]–[phenyl]–OCH2C2F4OC6F13

II-33: C8H17–[pyrimidine]–[phenyl]–OCH2C2F4OC8F17

II-34: C8H17–[pyrimidine]–[phenyl]–OCH2C2F4OC10F21

II-35: C8H17–[pyrimidine]–[phenyl]–OCH2C2F4OCF2C(CF3)3

II-36: C8H17–[pyrimidine]–[phenyl]–OC2H4OCH2CF2OC2F4OC4F9

II-37: C8H17–[pyrimidine]–[phenyl]–OC2H4OCH2C7F15

II-38: C8H17–[pyrimidine]–[phenyl]–OC2H4OCH2C5F11

II-39: C8H17–[pyrimidine]–[phenyl]–OC2H4OC2H4OCH2C7F15

II-40: C10H21O–[pyrimidine]–[phenyl]–OCH2CF2OCF2CF2OC4F9

II-41: C8H17O–[pyrimidine]–[phenyl]–OCH2CF2OCF2CF2OC4F9

II-42: C8H17O–[pyrimidine]–[phenyl]–OCH2CF2OC4F9

II-43

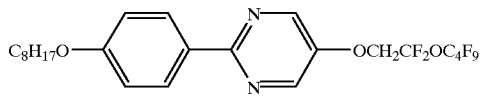

II-44

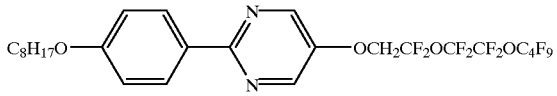

II-45

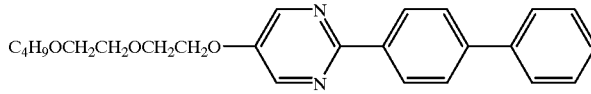

In addition to at least one species of the above-mentioned mesomorphic compound of the formula (I), the liquid crystal composition according to the present invention may preferably contain at least one species of an optically active compound having an asymmetrical carbon atom (as a chiral dopant), thus being formulated as a chiral smectic liquid crystal composition.

Particularly, when such a chiral smectic liquid crystal composition shows a larger spontaneous polarization of at least 10 nC/cm$^2$, the resultant liquid crystal device (or apparatus) may suitably be used since the device provides more advantageous effects as described hereinbelow.

The liquid crystal composition used in the present invention may further contain other compounds and additives, such as another mesomorphic compound, an antioxidant, an ultraviolet ray-absorbing agent, a dye and a pigment, as desired.

Hereinbelow, an embodiment of a process for producing the liquid crystal device according to the present invention as shown in FIG. 1 will be described with reference to FIGS. 2A–2E and FIGS. 3A–3F.

FIGS. 2A–2E shows a series of steps generally involved in a process for producing the (upper) electrode plate including the light-transmissive substrate 1a shown in FIG. 1, and FIGS. 3A–3F shows a series of steps generally involved in a process for producing the (lower) electrode plate including the light-transmissive substrate 1b.

Figure 2A:
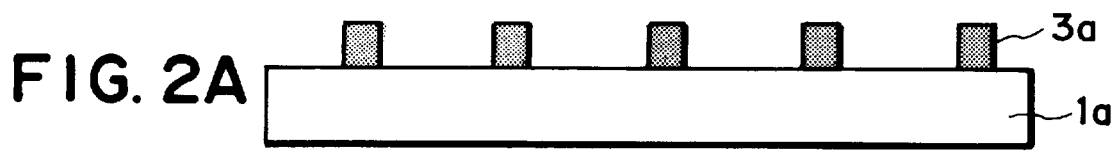
FIGS. 2A–2E are schematic sectional views for illustrating an embodiment of a process for producing an electrode plate used in the liquid crystal device of the present invention.

Referring to FIG. 2A, a plurality of metal electrodes (as auxiliary electrodes) 3a are formed on a light-transmissive substrate (e.g., glass substrate) 1a by forming a metal layer thereon, followed by patterning of the metal layer.

More specifically, the metal layer can be formed by a known film-forming process, such as vacuum vapor deposition, electron beam deposition, ion plating, chemical vapor deposition (CVD) or sputtering, depending on the metal species used. Further, the patterning of the metal layer can also be performed by, e.g., etching or photolithographic process, depending on the metal species used and/or a production process adopted.

The surface (wiring surface) of the substrate 1a on which the metal electrodes 3a are disposed may preferably be treated with, e.g., a silane coupling agent so as to enhance an adhesiveness with an insulating layer 4a formed in a later step.

Figure 2B:
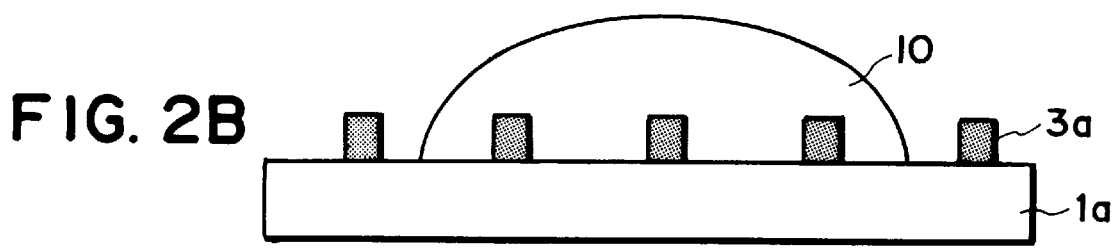

On the (wiring) surface of the substrate 1a, a predetermined amount of a polymeric material (un-cured) 10 was placed by using a constant volume-supplying device (not shown), such as a dispenser, a roller coater or a spinner coater (FIG. 2B).

Figure 2C:
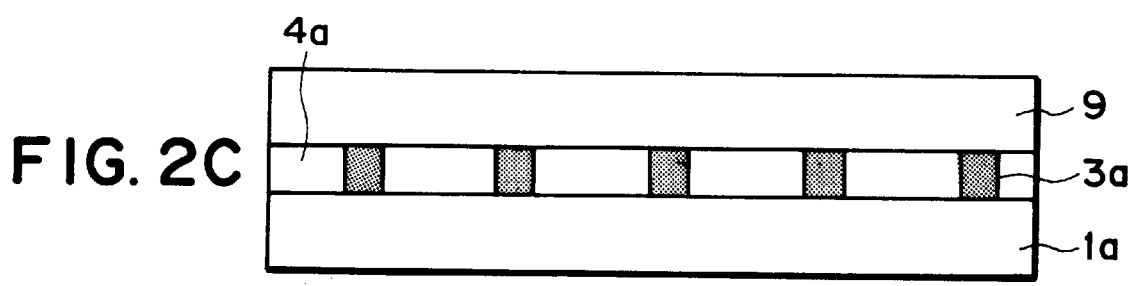

Thereafter, on the surface of the substrate 1a provided with the metal electrodes 3a and the polymeric material 10, a smooth or smoothing mold substrate (hereinafter called "smooth plate") 9 is gradually superposed so as not to generate air bubbles therebetween, thus filling the polymeric material 10 constituting an insulating layer 4a at spacings between the metal electrodes 3a (FIG. 2C) (hereinafter, the structure as shown in FIG. 2C is referred to as a "laminated structure").

Then, the laminated structure is set within a press (not shown) and pressed thereby, thus removing an excessive polymeric material from the surface of the metal electrodes 3a, whereby the spacings between the metal electrodes 3a are completely filled with the polymeric material 10.

The smooth plate 9 used in the above step may comprise any material if the resultant plate has a smooth surface and a property of being not deformed by pressure and optionally has a light-transmissive property in the case of using, e.g., UV light for curing the polymeric material 10. In the present invention, a surface-polished glass plate may preferably be used as the smooth plate 9. The press may be any one if it can uniformly extend the polymeric material 10 so as to fill the spacings between the metal electrodes 3a. Examples of such a press may include one using a hydraulic or air cylinder, a liquid pressure press and a roller press. In the step of pressing the laminated structure, it is also possible to heat the laminated structure by using, e.g., an electric heater or heated fluid, whereby the viscosity of the polymeric material 10 is effectively decreased to enhance a smooth extension thereof under pressure application.

When a UV-curable rosin is used as the polymeric material 10, the UV-curable resin can be cured by using a light source providing an output (energy) sufficient to completely cure the UV-curable resin. Examples of the light source may include a high- (or low-)pressure mercury-vapor lamp and a xenon lamp.

Figure 2D:
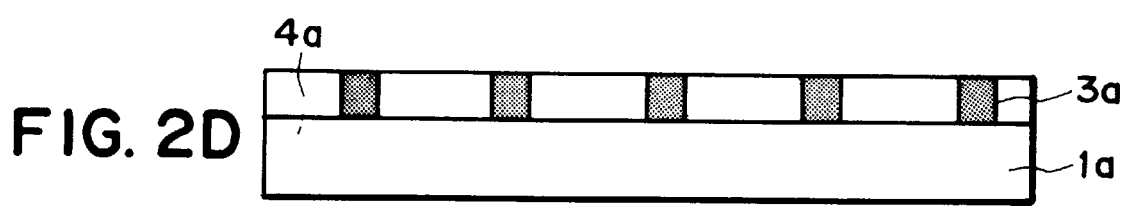

Then, the smooth plate 9 is removed from the laminated structure by using a peeling device (not shown) (FIG. 2D).

Figure 2E:
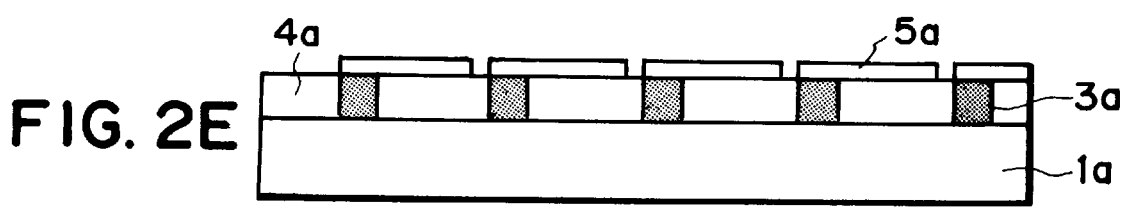

Thereafter, a plurality of transparent electrodes 5a (as principal electrodes) are formed on the metal electrodes 3a and the insulating layer 4 in a similar manner as in the metal electrodes 3a so as to being electrically connected with the associated metal electrodes 3a, respectively, at at least a part of each transparent electrode 5a (FIG. 2E).

Figure 3A:
FIGS. 3A–3F are schematic sectional views for illustrating another embodiment of a process for producing an electrode plate used in the liquid crystal device of the present invention.

On the other hand, the lower electrode plate including the light-transmissive substrate (e.g., glass substrate) 1b as shown in FIG. 1 is prepared through the steps shown in FIGS. 3A–3F in the same manner as in the above-described upper electrode plate (FIGS. 2A–2E) except that a masking (light-interrupting) member 6 is first formed on the light-transmissive substrate 1b as shown in FIG. 3A.

Figure 3B:
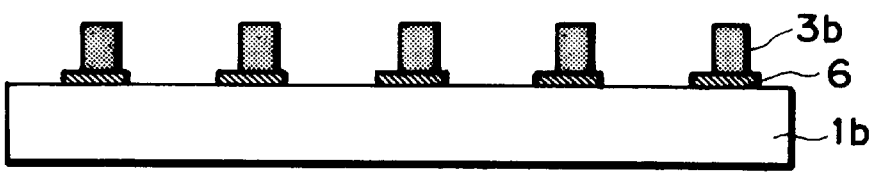
Figure 3C:
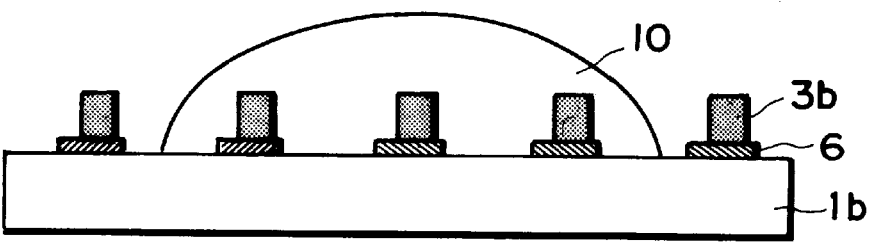
Figure 3D:
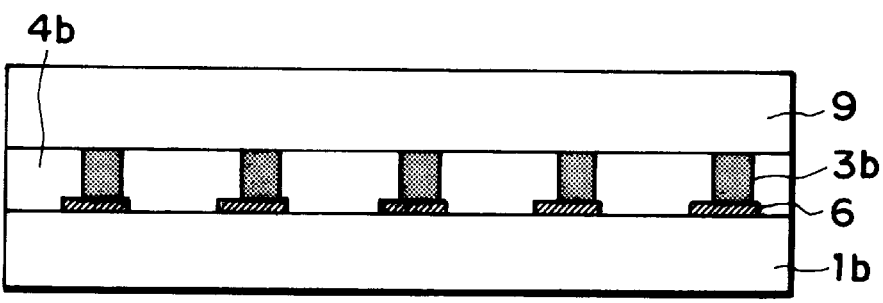
Figure 3E:
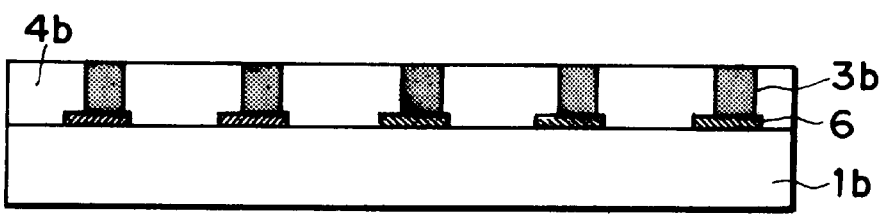
Figure 3F:
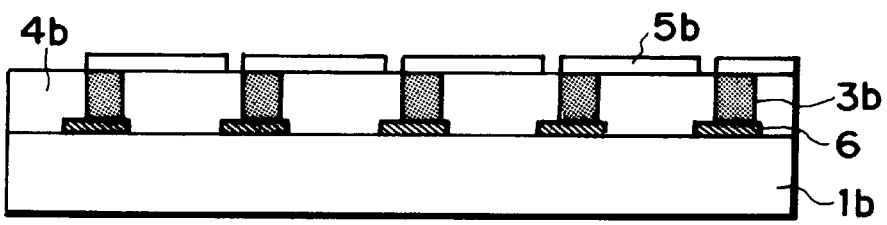

The masking member 6 can also be formed in the same manner as in the metal electrodes 3a described above so that the masking member 6 has at least a portion corresponding to each spacing between adjacent transparent electrodes 5b formed in a later step as shown in FIG. 3F.

Each of the thus-prepared (upper and lower) electrode plates is coated with an alignment control layer 7a (or 7b), after being coated with an insulating film as desired, by a known coating method, such as a spin coating, a roller coating or printing.

On one or both of the thus-treated electrode plates, spacer beads 8 as shown in FIG. 1 are dispersed, and the electrodes plates are applied to each other with a prescribed spacing defined by the spacer beads 8 and a sealing member (not shown) disposed at the periphery of the electrode plates. Thereafter, the spacing between the electrode plates is filled with the above-mentioned liquid crystal composition (the composition 2 as shown in FIG. 1), thus preparing a liquid crystal composition according to the present invention.

In the above embodiment, the principal electrodes 5a and 5b of the upper and lower electrode plates are disposed in a matrix form (i.e., so as to intersect with each other at right angles).

The above-prepared liquid crystal device is disposed between a pair of polarizers (not shown) arranged in cross nicols.

In the case where the liquid crystal device of the present invention is used as a display device, a backlight device (not shown) is disposed behind the light-transmissive substrate 1a so that the masking member 6 is located closer to the viewer side.

The liquid crystal device according to the present invention is used as a display element (medium), for various liquid crystal apparatus, one embodiment of which is described below.

Figure 4:
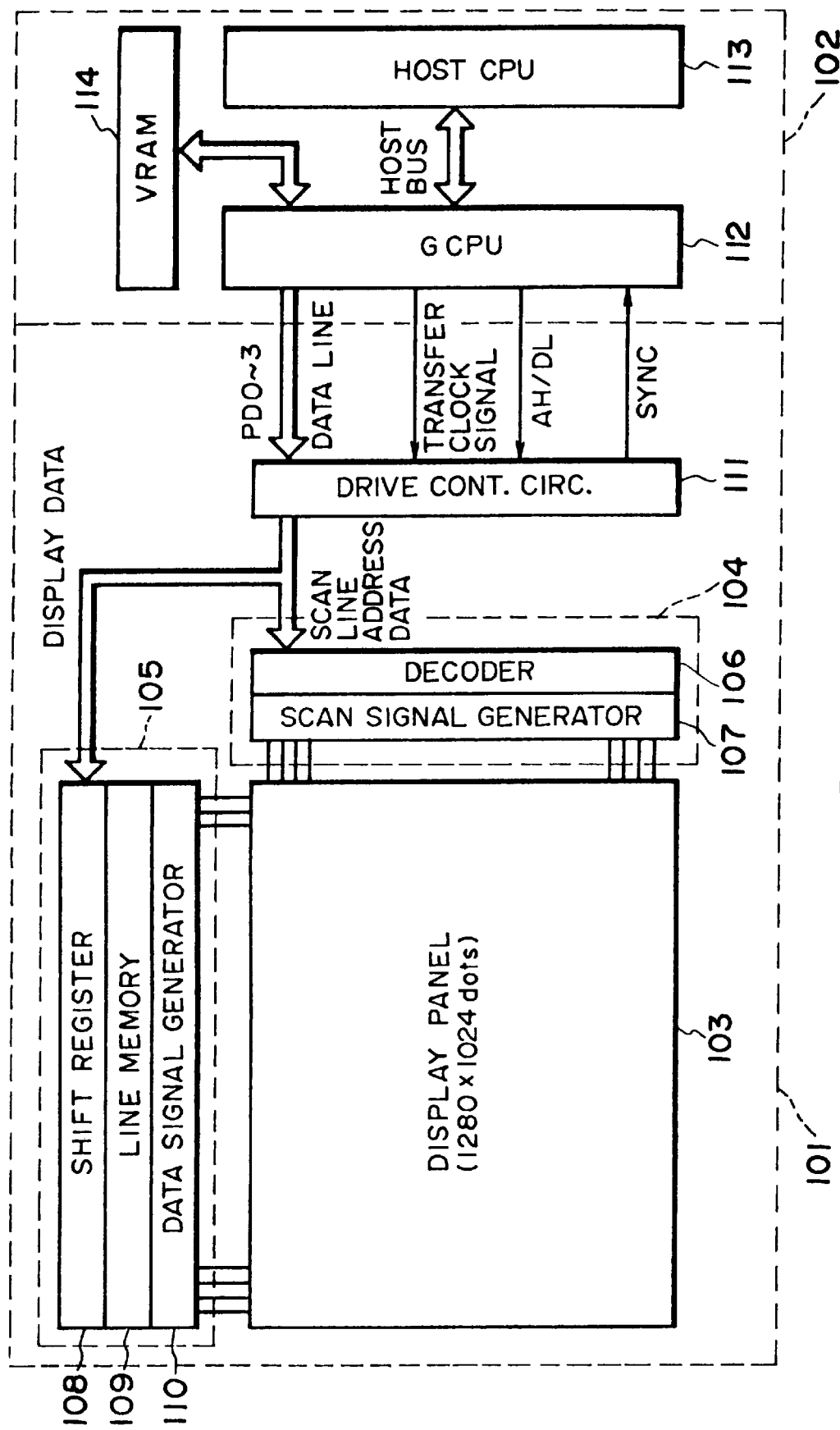
FIG. 4 is a block diagram showing a display apparatus comprising the liquid crystal device of the present invention and a graphic controller.
Figure 5:
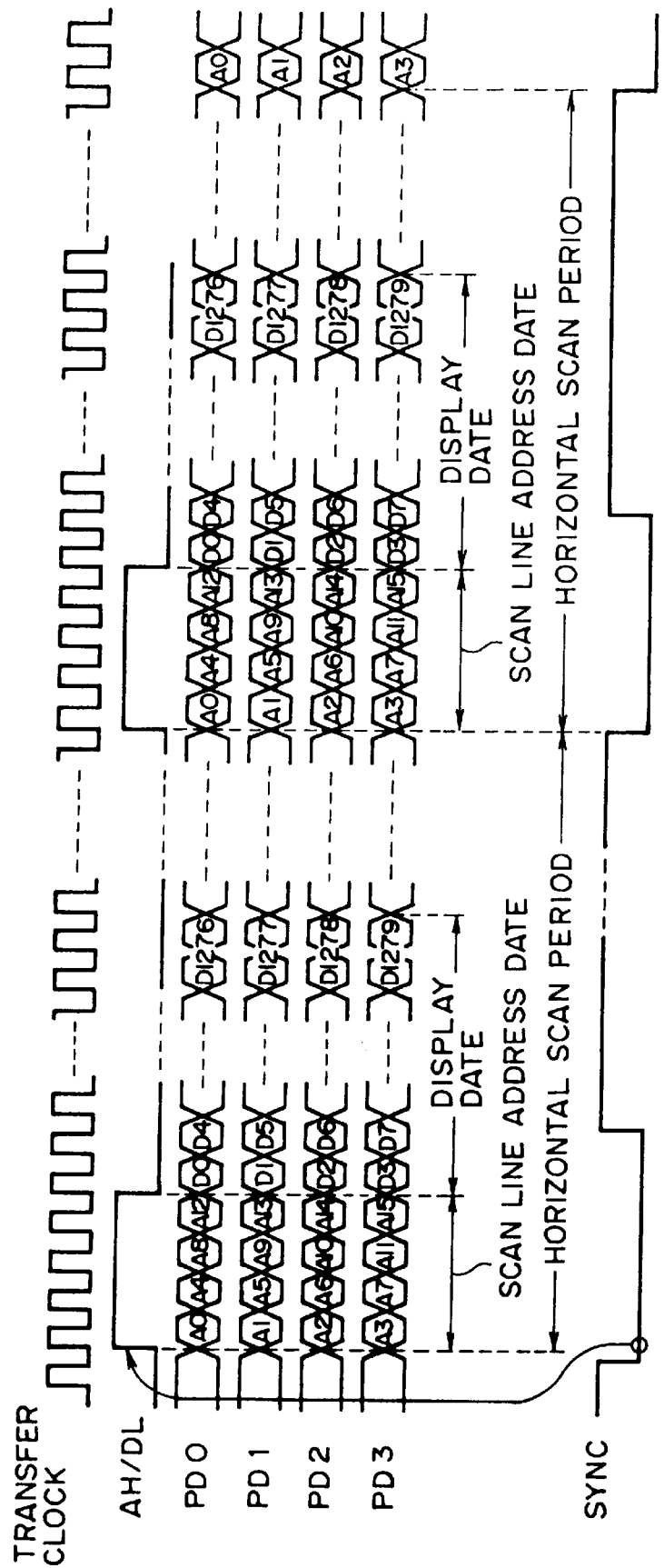
FIG. 5 is a time chart of image data communication showing time correlation between signal transfer and driving with respect to a liquid crystal display apparatus and a graphic controller.

Based on an arrangement appearing hereinbelow and data format comprising image data accompanied with scanning line address data and by adopting communication synchronization using a SYNC signal as shown in FIGS. 4 and 5, there is provided a liquid crystal display apparatus of the present invention which uses the liquid crystal device according to the present invention as a display panel portion.

Referring to FIG. 4, a (chiral smectic) liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (video-RAM or VRAM) 114.

Image data are generated in the graphic controller 102 in an apparatus body and transferred to a display panel 103 by signal transfer means. The graphic controller 102 principally comprises the GCPU 112 and the VRAM 114 and is in charge of management and communication of image data between the host CPU 113 and the liquid crystal display apparatus 101. A light source (not shown) is disposed at the back of the display panel 103.

The liquid crystal display apparatus of the present invention employs the above-described liquid crystal device showing a good switching characteristic as a display panel (medium), so that the display apparatus exhibits excellent drive characteristics and reliability and provides high-definition and large-area display images at high speed.

The liquid crystal device according to the present invention may be driven by driving methods as disclosed in, e.g., JP-A 59-193426, JP-A 59-193427, JP-A 60-156046 and JP-A 60-156047.

Figure 7:
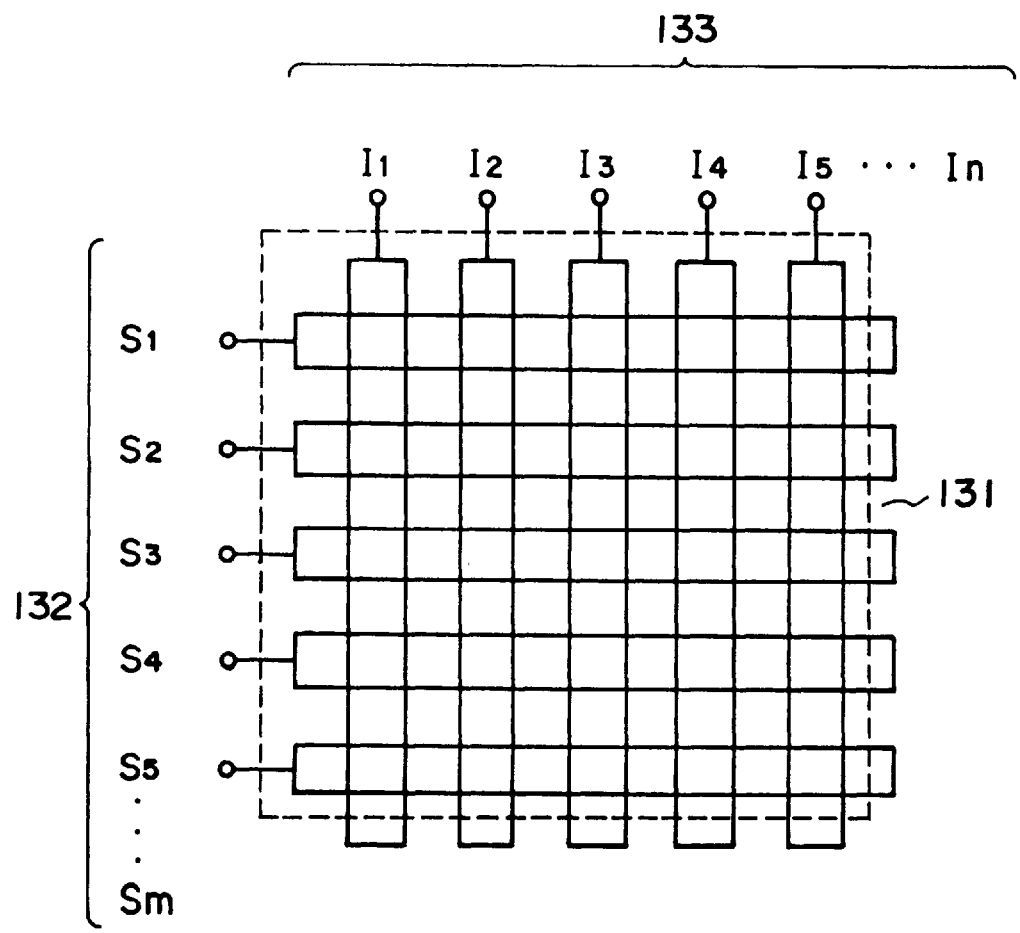
FIG. 7 is a plan view of an electrode matrix.
Figure 8A:
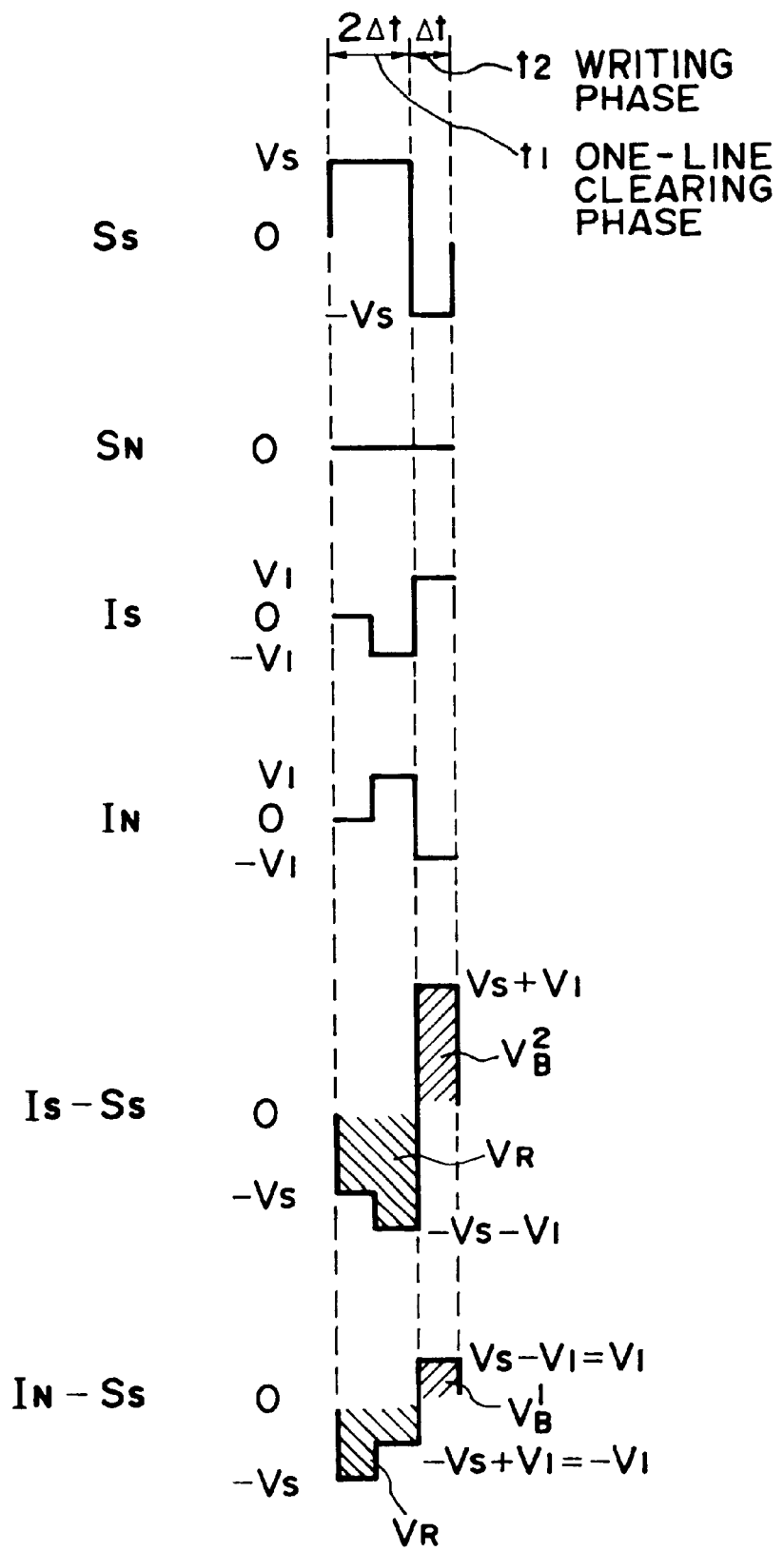
FIG. 8A shows an embodiment of unit driving waveforms.
Figure 8B:
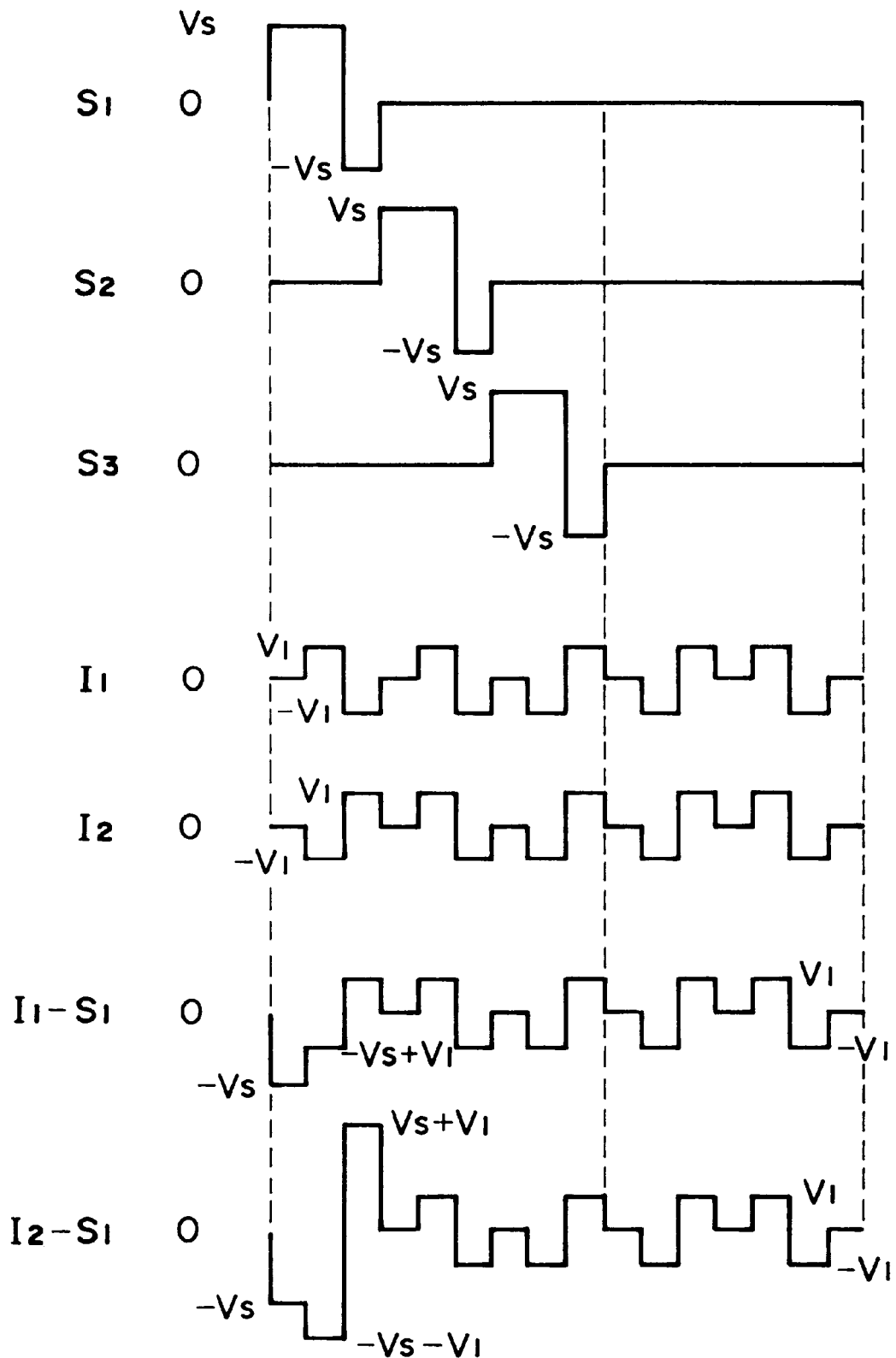
FIG. 8B is time-serial waveforms comprising a succession of such unit waveforms.

FIGS. 8A and 8B are waveform diagrams showing an example set of driving waveforms used in such a driving method. FIG. 7 is a plan view showing an electrode matrix used in a (chiral smectic) liquid crystal panel (device) 131 of a simple matrix-type. The liquid crystal panel 131 shown in FIG. 7 includes scanning electrodes 132 ($S_1, S_2, S_3, \ldots S_m$) and data electrodes 133 ($I_1, I_2, I_3, \ldots I_n$) intersecting each other so as to constitute a pixel at each intersection together with a (chiral smectic) liquid crystal disposed between the scanning electrodes 132 and data electrodes 133.

Figure 6:
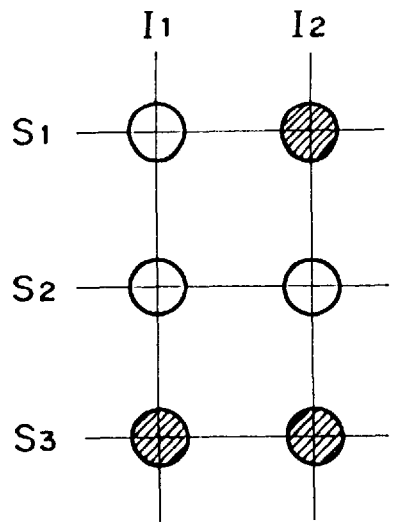
FIG. 6 is an illustration of a display pattern obtained by an actual drive using the time-serial waveforms shown in FIG. 8B.

Referring to FIG. 8A, at $S_S$ is shown a selection scanning signal waveform applied to a selected scanning line, at $S_N$ is shown a non-selection scanning signal waveform applied to a non-selected scanning line, at $I_S$ is shown a selection data signal waveform (providing a black (dark) display state) applied to a selected data line, and at $I_N$ is shown a non-selection data signal waveform (providing a white (bright) display state) applied to a non-selected data line. Further, at $I_S$–$S_S$ and $I_N$–$S_S$ in the figure are shown voltage waveforms applied to pixels on a selected scanning line, whereby a pixel supplied with the voltage $I_S$–$S_S$ assumes a black display state and a pixel supplied with the voltage $I_N$–$S_S$ assumes a white display state. FIG. 8B shows a time-serial waveform used for providing a display state as shown in FIG. 6.

In the driving embodiment shown in FIGS. 8A and 8B, a minimum duration (application time) Δt of a single polarity voltage applied to a pixel on a selected scanning line corresponds to the period of a writing phase $t_2$, and the period of a one-line clearing phase $t_1$ is set to 2Δt.

The parameters $V_S$, $V_I$ and Δt in the driving waveforms shown in FIGS. 8A and 8B are determined depending on switching characteristics of a liquid crystal material used.

Figure 9:
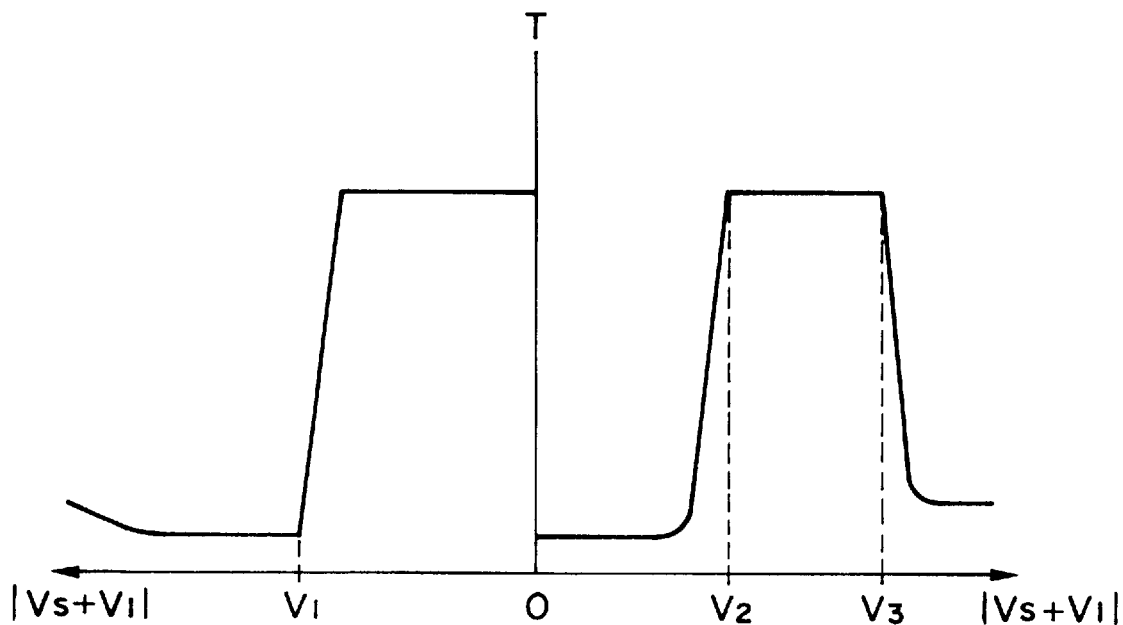
FIG. 9 is a V-T characteristic chart showing a change in transmittance under application of different drive voltages.

FIG. 9 shows a V–T characteristic, i.e., a change in transmittance T when a driving voltage denoted by ($V_S+V_I$) is changed while a bias ratio (as mentioned hereinbelow) is kept constant. In this embodiment, the parameters are fixed at constant values of Δt=50 μs and a bias ratio $V_I/(V_I+V_S)$= ⅓. On the right side of FIG. 9 is shown a result when the voltage ($I_N$–$S_S$) shown in FIG. 8A is applied to a pixel concerned, and on the left side of FIG. 9 is shown a result when the voltage ($I_S$–$S_S$) is applied to a pixel concerned, respectively while increasing the voltage ($V_S+V_I$). On both sides of the ordinate, the absolute value of the voltage ($V_S+V_I$) is separately indicated. At ($I_N$–$S_S$) and ($I_S$–$S_S$), a previous (display) state is cleared by applying a voltage $V_R$ and a subsequent (display) state is determined by voltages $V_B^1$ and $V_B^2$, respectively. Referring to FIG. 9, a relationship of $V_2<V_1<V_3$ holds. The voltage $V_1$ may be referred to as a threshold voltage in actual drive and the voltage $V_3$ may be referred to as a crosstalk voltage. More specifically, as shown in FIG. 8A, a voltage $V_1$ denotes a voltage value causing switching by applying a voltage signal $V_B^2$ and a voltage $V_3$ denotes a voltage value causing switching by applying a voltage signal $V_B^1$. Further, a voltage $V_2$ denotes a voltage value required for clearing the previous state by applying a voltage signal $V_R$. The crosstalk voltage $V_3$ generally exists in actual matrix drive of a (chiral smectic) liquid crystal device. In an actual drive, M2(V)=($V_3-V_1$)/ ($V_3+V_1$) can be used as a factor of a voltage range of $|V_S+V_I|$ allowing a matrix drive and may be referred to as a voltage margin parameter, which is preferably large enough. It is of course possible to increase the value of $V_3$ by increasing the bias ratio (i.e., by causing the bias ratio to approach a unity). However, a large bias ratio corresponds to a large amplitude of a data signal and leads to an increase in flickering and a lower contrast, thus being undesirable in respect of image quality. According to our study, a bias ratio of about ⅓–¼ was practical. On the other hand, when the bias ratio is fixed, the voltage margin parameter M2(V) largely depends on the switching characteristics of a liquid crystal material used and the device structure, and it is needless to say that a liquid crystal material providing a large M2(V) is very advantageous for matrix drive.

Further, it is possible to drive the liquid crystal device by changing a voltage application time (duration) Δt while keeping the driving voltage $(V_I+V_S)$ so as to provide a certain (constant) value. In this case, the drive characteristic of the liquid crystal device can also be evaluated in terms of a duration margin parameter (voltage application time margin parameter) $M2(\Delta T)=(\Delta t_2-\Delta t_1)/(\Delta t_2+\Delta t_1)$ wherein $\Delta t_1$ denotes a threshold duration and $\Delta t_2$ denotes a crosstalk duration.

As described above, by appropriately changing the directions (signs) of two different data signals, it is possible to control display state so that selected pixels are appropriately written in two states of "black" and "white" and non-selected pixels can retain the written "black" and "white" states at a certain temperature. The above-described voltage and duration margin parameters M2(V) and M2(Δt) vary depending on and are intrinsic to a liquid crystal material used and a cell structure employed. Further, the M2(V) and M2(Δt) also fluctuate according to a change in environmental temperature, so that optimum driving conditions should be required for an actual display apparatus in view of a liquid crystal material used, a cell (device) structure and an environmental temperature.

Figure 10:
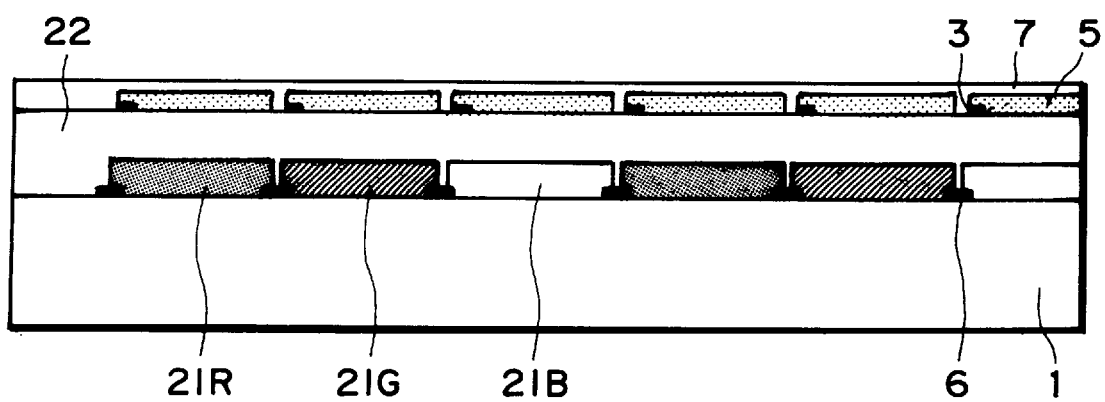
FIG. 10 is a schematic sectional view of an embodiment of an electrode plate used in the liquid crystal device of the present invention.

Next, another embodiment of the liquid crystal device of the present invention with reference to FIG. 10 in combination with FIG. 1.

In this embodiment, a liquid crystal device has a cell structure identical to that described in the above-described embodiment (based on FIGS. 1–3) except that the lower electrode plate including the substrate 1b (shown in FIG. 1 and FIGS. 3A–3F) is charged to an electrode plate shown in FIG. 10 including a color filter, thus constituting a color liquid crystal (display) device.

Referring to FIG. 10, the (lower) electrode plate includes: a light-transmissive substrate 1; a masking member 6 disposed on the substrate 1, a color filter comprising color filter segments 21R, 21G and 21B of red (R), green (G) and blue (B), disposed on the substrate 1 and separated from each other by the masking member 6; a flattening (or protective) layer 22 disposed so as to cover the color filter segments 21R, 21G and 21B; a plurality of auxiliary electrodes 3 disposed with spacing therebetween on the flattening layer 22; a plurality of principal electrodes 5 disposed on the flattening layer 22 so as to substantially fill the spacings between the auxiliary electrodes 3 (but leave a gap between each principal electrode and adjacent auxiliary electrode) while contacting and covering the top surface of the associated auxiliary electrodes 3; and an alignment control layer 7 disposed so as to cover the principal electrode 5.

The above electrode plate (including the color filter) may preferably be disposed at a viewer (light-outputting) side in view of prevention of color mixing and include a plurality of data electrodes (comprising the principal and auxiliary electrodes 5 and 3) to which a data signal is applied. On the other hand, the upper electrode plate including the substrate 1a (shown in FIG. 1) includes a plurality of scanning electrodes (comprising the principal and auxiliary electrodes 5a and 3a) to which a scanning signal is applied.

In this embodiment, the color filter (21R, 21G, 21B) is located closer to the viewer side as mentioned above. This is because it is possible to adopt a conventional step for forming a color filter to allow a lot of latitude in cell structure design and it is also possible to provide a larger opening (light-transmission) region by disposing the color filter on the substrate provided with the data electrodes in the liquid crystal device of a simple matrix-type. In the case where the liquid crystal device is not used for displaying color images, it is possible to omit the color filter segments 21R, 21G and 21B and the flattening layer 22.

In this embodiment, the auxiliary electrodes 3 may be disposed on the principal electrodes 5 or may be omitted, as desired.

The auxiliary electrodes 3 may preferably be made thin, e.g., in a thickness of at most 0.3 μm, so as not to provide the alignment control layer 7 with a larger unevenness which adversely affects an alignment state of liquid crystal molecules.

Further, in the case where only one of the alignment control layers 7 and 7a is subjected to a uniaxial aligning (e.g., rubbing) treatment, the uniaxial aligning treatment may preferably be performed to the alignment control layer 7a of the upper electrode plate as shown in FIG. 1. This is because the alignment of liquid crystal molecules is largely affected by the alignment control layer which has been subjected to the uniaxial aligning treatment, so that the surface of the alignment control layer may referably be well flattened.

The uniaxial aligning treatment may preferably be performed in a direction nonparallel with a longitudinal direction of the electrodes in view of prevention of an occurrence of alignment defects. In a preferred embodiment, the direction of the uniaxial aligning treatment may preferably form an angle of at most 30 degrees with respect to the longitudinal direction of the electrode and may particularly desirably be aligned with the longitudinal direction of the electrodes.

The masking member 6, principal electrodes 5, auxiliary electrodes 3 and alignment control layer 7 shown in FIG. 10 may comprise materials identical to those described above, respectively.

The color filter (segments 21R, 21G and 21B) may be any color filter of, e.g., a pigment-dispersion type or a dye-type, and may be formed by various methods, such as a photolithography, a wet-coating (or printing) method, an ink jet method, and a sublimation method, depending on the material used.

The flattening layer 22 may comprise an organic material or an inorganic material, as desired. The flattening layer 22 may preferably be formed by wet coating so as not to damage the color filter.

As described above, in this embodiment, one electrode plate including the substrate la provided with the scanning electrodes as shown in FIG. 1 and the other electrode plate including the substrate 1 provided with the data electrodes as shown in FIG. 10 are used in combination to provide a liquid crystal device according to the present invention.

In preparation of the electrode plate shown in FIG. 10, the formation of the insulating layer disposed between the auxiliary electrode is unnecessary, thus reducing the production cost.

According to our simulation, it has been formed that the scanning electrodes having a larger resistivity (electric resistance) cause a larger voltage waveform distortion but the data electrodes having a larger resistivity do not cause so larger voltage waveform distortion. More specifically, when the resistivity of the data electrodes is 40 times that of the scanning electrodes, the data and scanning electrodes have a substantially identical influence on the voltage waveform distortion.

From the results of such a simulation, we assume that the voltage waveform distortion is attributable to an inversion current passing through the electrodes when a voltage in excess of a threshold voltage is applied to the liquid crystal layer. It is also assumed that the magnitude of such an inversion current is directly proportional to that of a spontaneous polarization of the liquid crystal composition used. Accordingly, as the liquid crystal composition has a larger spontaneous polarization, the voltage waveform distortion becomes larger, thus requiring a lowered resistivity of the electrodes employed.

The inversion current presumably generated at the time of applying a voltage larger than a threshold voltage to the liquid crystal composition. When a selected pixel is supplied with such a voltage (over the threshold voltage), the voltage is generally applied to all the pixels in alignment with the selected pixel on the identical scanning line (electrode). At this time, pixels other than the selected pixel on the identical data line (electrode) are generally not supplied with the above voltage. In other words, all the portions of the liquid crystal composition with respect to the pixels on the scanning line contribute to the generation of the inversion current but only a portion of the liquid crystal composition with respect to the selected pixel on the data line contributes to the generation of the inversion current.

From the above consideration, the distortion (or delay) of voltage waveform is presumed to be largely affected by a charge in resistivity of the scanning electrodes.

Hereinbelow, the present invention will be described more specifically based on Examples. It is however to be understood that the present invention is not restricted to these Examples.

EXAMPLE 1

A liquid crystal display device including a pair of electrode plates was prepared in the following manner.

A 80 nm-thick masking member of Cr was formed on a double side-polished blue plate glass (300×310×1.1 mm) by sputtering, followed by patterning through a photolithographic process including an etching step to form a glass substrate provided with the masking member including elongated portions in a width of 30 $\mu$m at a pitch of 320 $\mu$m as shown in FIG. 3A.

On the glass substrate having thereon the masking member, a 2 $\mu$m-thick layer of Al was formed by sputtering and patterned in a width of 18 $\mu$m at a pitch of 320 $\mu$m by a photolithographic process including an etching step to form a plurality of auxiliary electrodes as shown in FIG. 3B.

On the surface (where the auxiliary electrodes are formed) of the glass substrate, a coupling treatment liquid comprising 1 wt. part of a silane coupling agent ("A-174", mfd. by Nippon Unicar K.K.) and 40 wt. parts of ethyl alcohol was applied by spin coating, followed by heat-treatment in an oven at 100° C. for 20 min.

On the thus-treated surface of the glass substrate, an acrylic UV-curable resin comprising a mixture of pentaerythritol triacrylate/neopentyl glycol diacrylate/1-hydroxycyclohexyl phenyl ketone (=50/50/2 by weight) was placed dropwise by using a dispenser as shown in FIG. 3C.

Further thereon, a smooth plate (double side-polished blue plate glass; 300×310 mm) was gradually superposed so as not to generate air bubbles therebetween. Thereafter, the glass substrate and the smooth plate were pressed in a 1 ton roller press under a pressure of 700 kg at a feed rate of 30 cm/min. The laminate of the glass substrate and the smooth plate, after taking out from the roller press, was irradiated with UV rays for 2 min. by using a UV ray irradiation apparatus including four 100 W-high pressure mercury vapor lamps to curve the UV-curable resin (FIG. 3D).

Then, the smooth plate was removed from the glass substrate by using a releasing tool (FIG. 3E).

On the auxiliary electrodes and the UV-cured resin formed on the glass substrate, a 150 nm-thick ITO film was formed by sputtering, followed by patterning of the ITO film so as to be electrically connected to associated auxiliary electrodes through a photolithographic-etching process to form a plurality of principal (transparent) electrodes each having a width of 300 $\mu$m and a pitch of 320 $\mu$m.

The thus prepared electrode plate was provided with the masking member arranged so as to interrupt light passing through spacings between the principal electrodes.

The other electrode plate was prepared in the same manner as in the first electrode plate except that the masking member was not formed as shown in FIGS. 2A–2E.

Then, the electrode plate (including the masking member) was coated with a mixture of a ladder-type polysiloxane containing SnOx fine particles (particle size=100 Å) dispersed therein and ethanol (solid content=10 wt. %) by spin coating, followed by pre-drying at 80° C. for 5 min. and hot baking at 200° C. for 1 hour to form a 2000 Å-thick layer.

The other electrode plate (including no masking member) was coated with a 0.8 wt. %-solution of a polyimide precursor having a recurring unit represented by the formula shown below, followed by pre-drying at 80° C. for 5 min. and hot baking at 200° C. for 1 hour to form a 6 nm-thick alignment control layer, which was then subjected to rubbing treatment with a nylon cloth to effect a uniaxial aligning treatment.

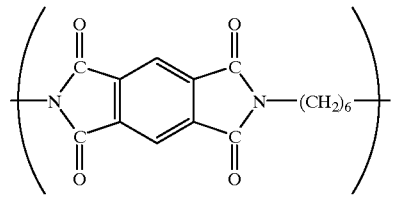

After silica beads (average particle size=2 $\mu$m) were dispersed on one of the electrode plates, the electrode plates were applied to each other with a sealing member so that the electrodes of one electrode plate and those of the other electrode plate were arranged in a matrix form to form a blank cell, which. was then filled with a liquid crystal composition A (Composition A) shown below in its isotropic liquid state, followed by cooling to room temperature at a rate of 1° C./min. to prepare a liquid crystal device as shown in FIG. 1.

<Composition A>

| Structural formula | wt. parts |
|---|---|
| $C_8H_{17}$—[pyrimidine]—[phenyl]—$OCH_2CF_2OCF_2CF_2OC_4F_9$ | 45 |
| $C_8H_{17}$—[pyrimidine]—[phenyl]—$OCH_2CF_2OC_2F_4OC_2F_4OCF_3$ | 30 |
| $C_8H_{17}$—[pyrimidine]—[phenyl]—$OCH_2C_3F_6OC_4F_9$ | 15 |
| $C_6H_{13}O$—[phenyl]—[phenyl]—$COO$—*[tetrahydropyran with CF_3]*—$OC_6H_{13}$ | 5 |
| $C_8H_{17}O$—[pyrimidine]—[phenyl]—$OCH_2$—*[lactone with CH_3, CH_3]* | 2 |

Phase transition temperatures (0° C.)

$$\text{Iso.} \xrightarrow{77} \text{SmA} \xrightarrow{41} \text{SmC*} \xrightarrow{3} \text{Cry.}$$

(Iso.: isotropic phase, SmA: smectic A phase,
SmC*: chiral smectic C phase, Cry.: crystal)

Spontaneous polarization (Ps) = 31.1 nC/cm² (30° C.)

Then, a pair of polarizers were applied (bonded) to both sides of the liquid crystal device so as to provide a cross nicol relationship.

Behind the liquid crystal device (on the side closer to the electrode plate including no masking member), a backlight device was disposed, thus preparing a liquid crystal display device to be viewed from the side of the electrode plate including the masking member.

The thus prepared liquid crystal display device provided a uniform alignment of the liquid crystal composition A due to a reduced unevenness at the boundaries between the electrode plates and the liquid crystal composition A and showed a decreased voltage waveform distortion. Further, the device could effect uniform switching when driven and also could effect display without malfunction even at the time of high-speed switching. In addition, a portion corresponding to the spacing between the principal electrodes was covered with the masking member to completely prevent leakage of light from a non-switching region, thus allowing a high quality display providing a contrast of at least 100.

EXAMPLE 2

A liquid crystal display device was prepared in the same manner as in Example 1 except that the liquid crystal composition A was changed to a liquid crystal composition B shown below.

| Structural formula | wt. parts |
|---|---|
| $C_8H_{17}$—[pyrimidine]—[phenyl]—$OCH_2$—$CF_2$—$OCF_2CF_2$—$OC_4F_9$ | 80 |

(phase transition (° C.))

$$S_x \xrightleftharpoons{-8} S_C \xrightleftharpoons{50} S_A \xrightleftharpoons{75} \text{Iso.}$$

-continued

| Structural formula | wt. parts |
|---|---|
| 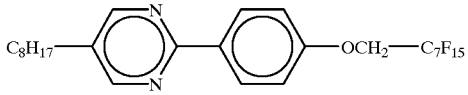 $Sx \underset{71}{\rightleftarrows} S_C \underset{80}{\rightleftarrows} S_A \underset{117}{\rightleftarrows}$ Iso. | 3 |
| 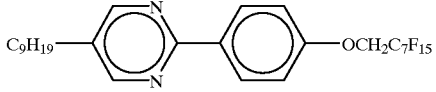 $Sx \underset{71}{\rightleftarrows} S_C \underset{85}{\rightleftarrows} S_A \underset{112}{\rightleftarrows}$ Iso. | 3 |
| 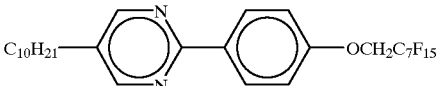 $Sx \underset{75}{\rightleftarrows} S_C \underset{87}{\rightleftarrows} S_A \underset{104}{\rightleftarrows}$ Iso. (chiral dopant) | 4 |
| 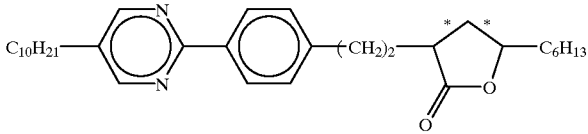 $Ps = 26 \text{ nC/cm}^2 (25° \text{ C.})$ | 5 |

In the above phase transition series, Sx denotes a smectic phase (unidentified); Sc denotes a smectic C phase; $S_A$ denotes a smectic A phase; and Iso denotes an isotropic phase.

The liquid crystal display device, similarly as in Example 1, provided a uniform alignment and could effect high quality display without malfunction at the time of high-speed switching. Further, the device provided a contrast of at least 100.

EXAMPLE 3

A liquid crystal display device was prepared in the following manner.

One electrical plate was prepared in the same manner as in the electrode plate including no masking member (as shown in FIGS. 2A–2E) in Example 1.

The other electrode plate as shown in FIG. 10 was prepared as follows.

On a double side-polished blue plate glass (300×310×1.1 mm), a 20 μm-thick layer of Mo—Ta was formed by sputtering and patterned through a photolithographic-etching to form a glass substrate coated with a masking member including elongated portions each having a width of 18 μm.

On the glass substrate, a photosensitive resin solution containing a green pigment dispersed therein was applied by spin coating and pre-dried at 80° C., followed by spin coating and pre-dried at 80° C., followed by exposure to light, development and hot backing at 250° C. to form 1.3 μm-thick stripe-shaped color filter segments of green in a width of 95 μm. Similarly, a photosensitive resin solution containing a red pigment and a photosensitive resin solution containing blue pigment were successively used for forming red color filter segments and blue color filter segments, respectively. The resultant color filter included color filter segments of green, red and blue each having a width of 95 μm at a spacing therebetween of 8 μm.

In this step, the photosensitive resin solution for green comprised a 10%-solution of a photosensitive resin in N-methyl-2-pyrrolidone ("PA-1000", mfd. by Ube Kosan K.K.) and a green pigment ("Lionol Green GYK" (C.I. No. 74265), mfd. by Toyo Inki Seizo K.K.) dispersed therein in a ratio of pigment:resin=1:2. The photosensitive resin solution for red comprised a 10%-solution of a photosensitive resin in N-methyl-2-pyrrolidone ("PA-1000", mfd. by Ube Kosan K.K.) and a red pigment ("Irgagin Red BRT" (C.I. No. 71127), mfd. by Ciba-Geigy Corp.) dispersed therein in a ratio of pigment:resin=1:2. The photosensitive resin solution for blue comprised a 10%-solution of a photosensitive resin in N-methyl-2-pyrrolidone ("PA-1000", mfd. by Ube Kosan K.K.) and a blue pigment ("Heliogen Blue L7080" (C.I. No. 74160), mfd. by BASF Co.) dispersed therein in a ratio of pigment:resin=1:2.

On the color filter, a 3 μm-thick flattening layer was formed by applying and baking an acrylic resin ("LC-2040", mfd. by Sanyo Kasei Kogyo K.K.).

Thereafter, on the flattening layer, 8 μm-wide auxiliary electrodes including three layers of Ta—Mo (30 nm)/Al—Si—Cu (150 nm)/Ta—Mo (50 nm) were formed by sputtering and patterning.

On the auxiliary electrodes and the flattening layer, 70 nm-thick principal (transparent) electrodes of ITO were formed by sputtering and patterned by a photolithographic-etching process in a stripe shape including alternating 47 µm-wide elongated electrodes and 30 µm-wide elongated electrodes each with a spacing of 8 µm.

Then, on the principal electrodes, a mixture of a ladder-type polysiloxane containing SnOx fine particles (particle size=100 Å) dispersed therein and ethanol (solid content=10 wt. %) was applied by spin coating, followed by pre-drying at 80° C. for 5 min. and hot baking at 200° C. for 1 hour to form a 2000 Å-thick alignment control layer, thus preparing an electrode plate.

The thus-prepared pair of electrode plates were used for preparing a liquid crystal display device in the same manner as in Example 1.

The resultant liquid crystal display device provided similar effects as in Example 1.

As described hereinabove, according to the present invention, it is possible to realize a liquid crystal device providing an excellent alignment state of liquid crystal molecule while minimizing the voltage waveform distortion based on a specific combination of a liquid crystal composition containing the fluorine-containing mesomorphic compound of the formula (I) stably providing a bookshelf structure or a layer structure close thereto and an electrode plate including auxiliary electrodes embedded with an insulating resin. The resultant liquid crystal device is also excellent in contrast, resolution and brightness and is capable of effecting a good motion-picture display in a large picture area.

When the liquid crystal device was used in combination with, e.g., a driving means and a backlight device, it is possible to provide a liquid crystal (display) apparatus excellent in display characteristics.

What is claimed is:

1. A liquid crystal device, comprising:
   a pair of first and second electrode plates and a liquid crystal composition disposed between the electrode plates,
   wherein the first electrode plate comprises a light-transmissive substrate, a plurality of electrodes including principal electrodes and auxiliary electrodes supported on the light-transmissive substrate, and an insulating layer; each auxiliary electrode being disposed between an associated principal electrode and the light-transmissive substrate so as to be electrically connected with at least a part of the associated principal electrode, and the auxiliary electrodes being disposed with spacings therebetween which are filled with the insulating layer, and
   the second electrode plate comprises a light-transmissive substrate, a color filter disposed on the light-transmissive substrate, a flattening layer disposed on the color filter, and a plurality of electrodes including principal electrodes and auxiliary electrodes disposed on the flattening layer; each auxiliary electrode being disposed between an associated principal electrode and the flattening layer so as to be electrically connected with at least a part of the associated principal electrode, and each principal electrode contacting the flattening layer at a spacing between an associated auxiliary electrode and an adjacent auxiliary electrode.

2. A device according to claim 1, wherein each of the first and second electrode plates is provided with an alignment control layer, only the alignment control layer provided to the first electrode plate being subjected to a uniaxial aligning treatment.

3. A device according to claim 1, wherein the liquid crystal composition comprises at least one species of a fluorine-containing mesomorphic compound comprising a fluorocarbon terminal portion and a hydrocarbon terminal portion, the terminal portions being connected with a central core, and having smectic mesophase or latent smectic mesophase.

4. A device according to claim 1, wherein the insulating layer comprises a polymeric material.

5. A device according to claim 2, wherein the alignment control layer subjected to a uniaxial aligning treatment comprises a polyimide film.

6. A device according to claim 1, wherein the principal electrodes comprises transparent electrodes.

7. A device according to claim 1, wherein the light-transmissive substrate of the first electrode plate or the second electrode plate is provided with a masking member.

8. A liquid crystal apparatus comprising a liquid crystal device according to claim 1, a backlight device disposed outside the first electrode plate and means for driving the liquid crystal device.

9. An apparatus according to claim 8, wherein the plurality of electrodes of the first electrode plate are supplied with a scanning signal and wherein the plurality of electrodes of the second electrode plate are supplied with a data signal.

10. A liquid crystal device according to claim 1, wherein the second electrode plate is disposed to output light.

11. A liquid crystal device according to claim 1, wherein each said auxiliary electrode and the insulating layer together form a substantially flat surface, and the associated principal electrode is disposed as a substantially flat film on the auxiliary electrode and the insulating layer.

12. A device according to claim 11, wherein each of the first and second electrode plates is provided with an alignment control layer, only the alignment control layer provided to the first electrode plate being subjected to a uniaxial aligning treatment.

13. A device according to claim 11, wherein the liquid crystal composition comprises at least one species of a fluorine-containing mesomorphic compound comprising a fluorocarbon terminal portion and a hydrocarbon terminal portion, the terminal portions being connected with a central core, and having smectic mesophase or latent smectic mesophase.

14. A device according to claim 11, wherein the insulating layer comprises a polymeric material.

15. A device according to claim 12, wherein the alignment control layer to be subjected to a uniaxial aligning treatment comprises a polyimide film.

16. A device according to claim 11, wherein the principal electrodes comprises transparent electrodes.

17. A device according to claim 11, wherein the light-transmissive substrate of the first electrode plate or the second electrode plate is provided with a masking member.

18. A liquid crystal apparatus including a liquid crystal device according to claim 11, a backlight device disposed outside the first electrode plate and means for driving the liquid crystal device.

19. An apparatus according to claim 18, wherein the plurality of electrodes of the first electrode plate are supplied with a scanning signal and those of the second electrode plate are supplied with a data signal.

20. A liquid crystal device according to claim 11, wherein the second electrode plate is disposed to output light.

* * * * *

UNITED STATES PATENT AND TRADEMARK OFFICE
CERTIFICATE OF CORRECTION

PATENT NO.    : 6,252,641 B1
DATED         : June 26, 2001
INVENTOR(S)   : Hidetoshi Tsuzuki et al.

It is certified that error appears in the above-identified patent and that said Letters Patent is hereby corrected as shown below:

<u>Title page,</u>
Item [56], References Cited, FOREIGN PATENT DOCUMENTS,
"0 473 168 3/1992 (JP)." should read -- 0 473 168 3/1992 (EP). --,
"2142753 5/1990 (JP)." should read -- 2-142753 5/1990 (JP). -- and
"619497 8/1994 (JP). should read -- 6-19497 8/1994 (JP). --

<u>Column 1,</u>
Line 64, "a ' state" should read -- a state --.

<u>Column 2,</u>
Line 25, "substrate" should read -- substrates --;
Line 50, "Raddiffe" should read -- Radcliffe --; and
Line 61, "plats" should read -- plates --.

<u>Column 3,</u>
Line 27, "1/3 14 1/5" should read -- 1/3 - 1/5 --.

<u>Column 4,</u>
Line 30, "plates" should read -- plate --; and
Line 56, "plates" should read -- plate --.

<u>Column 6,</u>
Line 8, "Slayer" should read -- layer --;
Line 13, "substrate lb" should read -- substrate 1b --;
Line 14, "substrate la" should read -- substrate 1a --;
Line 24, "substrate la" should read -- substrate 1a --;
Line 43, "substrate la" should read -- substrate 1a --; and
Line 58, "electrodes 7a(7b)" should read -- electrodes 5a(5b) --

<u>Column 9,</u>
Line 61, "–O–$C_{rc}H_{2rc}$—$C_{rc}H_{2rc}$," should read -- –O–$C_{rc}H_{2rc}$–, –$C_{rc}H_{2rc}$–, --.

<u>Column 10,</u>
Line 58, "bond" should read -- bond, --; and
Line 65, "yl" should read -- $y^1$ --.

UNITED STATES PATENT AND TRADEMARK OFFICE
CERTIFICATE OF CORRECTION

PATENT NO. : 6,252,641 B1
DATED : June 26, 2001
INVENTOR(S) : Hidetoshi Tsuzuki et al.

It is certified that error appears in the above-identified patent and that said Letters Patent is hereby corrected as shown below:

Column 11,
Line 2, "CO–O–(CH$_2$)$_{ra}$–," should read -- –CO–O–(CH$_2$)$_{ra}$–, --;
Line 4, "–(CH$_2$)$_{ra}$–O(CH$_2$)$_{rb}$," should read -- –(CH$_2$)$_{ra}$–O(CH$_2$)$_{rb}$–, --;
Line 60, "–(CH$_2$CH$_2$)$^{ka}$–" should read -- –(CH$_2$CH$_2$)$_{ka}$– --; and
Line 64, "X$_2$, Y$_2$ and Z$_2$" should read -- X$^2$, Y$^2$ and Z$^2$ --.

Column 12,
Line 12, –O–CO–C$_{qd}$H$_{2qd+1}$;" should read -- –O–CO–C$_{qd}$H$_{2qd+1}$, --;
Line 13, "gd" should read -- qd --; and
Line 21, "descried" should read -- described --.

Column 27,
Line 35, "shows" should read -- show --;
Line 38, "shows" should read -- show --;
Line 43, "la" should read -- 1a --;
Line 58, "substrate la," should read -- substrate 1a, --; and
Line 63, "substrate la" should read -- substrate 1a --.

Column 28,
Line 39, "rosin" should read -- resin --; and
Line 54, "lb" should read -- 1b --.

Column 29,
Line 13, "Sb" should read -- 5b --.

Column 31,
Line 36, "substrate 1," should read -- substrate 1; --;

Column 32,
Line 19, "referably" should read -- preferably --; and
Line 45, "substrate la" should read -- substrate 1a --.

Column 33,
Line 7, "current" should read -- current is --; and
Line 32, "A" should read -- An --.

UNITED STATES PATENT AND TRADEMARK OFFICE
CERTIFICATE OF CORRECTION

PATENT NO.   : 6,252,641 B1
DATED        : June 26, 2001
INVENTOR(S)  : Hidetoshi Tsuzuki et al.

It is certified that error appears in the above-identified patent and that said Letters Patent is hereby corrected as shown below:

Column 34,
Line 53, "which." should read -- which --.

Column 35,
Line 35, "(0ºC.)" should read -- (ºC.) --.

Column 37,
Line 39, "Sc" should read -- $S_c$ --;
Line 65, "by spin" should be deleted; and Column 38,
Line 61, "3 $\mu$n-thick" should read -- 3 $\mu$m-thick --.

Column 39,
Line 31, "was" should read -- is --.

Column 40,
Line 14, "comprises" should read -- comprise --; and
Line 52, "comprises" should read -- comprise --.

Signed and Sealed this

Tenth Day of September, 2002

Attest:

JAMES E. ROGAN
Attesting Officer     Director of the United States Patent and Trademark Office

UNITED STATES PATENT AND TRADEMARK OFFICE
CERTIFICATE OF CORRECTION

PATENT NO.    : 6,252,641 B1
DATED         : June 26, 2001
INVENTOR(S)   : Hidetoshi Tsuzuki et al.

It is certified that error appears in the above-identified patent and that said Letters Patent is hereby corrected as shown below:

Column 21,
Line 24, I-100 should read

"  "

-- I-100 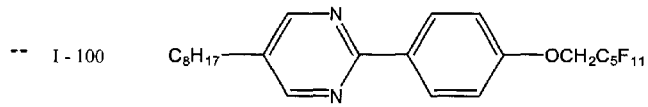

I-101 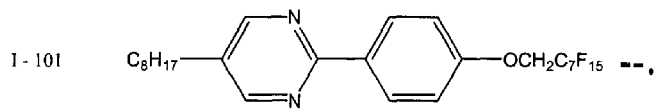 --.

Signed and Sealed this

Sixteenth Day of September, 2003

JAMES E. ROGAN
*Director of the United States Patent and Trademark Office*